United States Patent [19]
Borzym et al.

[11] Patent Number: 5,732,874
[45] Date of Patent: *Mar. 31, 1998

[54] METHOD OF FORMING SEAMED METAL TUBE

[75] Inventors: John J. Borzym, Northville, Mich.; Theodore H. Krengel, Flossmoor, Ill.; Charles A. Willetts, West Midland, England; Curtis R. Brown; Edward Wiesenthal, III, both of Novi, Mich.

[73] Assignee: The IDOD Trust, Novi, Mich.

[*] Notice: The term of this patent shall not extend beyond the expiration date of Pat. No. 5,344,062.

[21] Appl. No.: 399,054

[22] Filed: Mar. 8, 1995

Related U.S. Application Data

[63] Continuation-in-part of Ser. No. 83,099, Jun. 24, 1993, and Ser. No. 232,505, Apr. 25, 1994, Pat. No. 5,474,227, which is a continuation-in-part of Ser. No. 83,078, Jun. 24, 1993, Pat. No. 5,344,062.

[51] Int. Cl.$^6$ ............... B21C 37/09; B23K 9/02
[52] U.S. Cl. ............... 228/147; 228/150; 228/231
[58] Field of Search ............... 228/17.5, 147, 228/150, 214, 219, 231, 250

[56] References Cited

U.S. PATENT DOCUMENTS

| | | |
|---|---|---|
| 1,848,671 | 3/1932 | Sievern . |
| 2,136,957 | 11/1938 | Sendzimir . |
| 2,224,410 | 12/1940 | Sendzimir . |
| 2,575,381 | 11/1951 | Colby . |
| 2,771,669 | 11/1956 | Armstrong et al. . |
| 2,792,490 | 5/1957 | Risch et al. . |
| 3,073,019 | 1/1963 | Caplan et al. . |
| 3,350,771 | 11/1967 | Durst . |
| 3,354,864 | 11/1967 | Knapp . |
| 3,459,587 | 8/1969 | Hunter et al. . |
| 4,287,238 | 9/1981 | Stavros . |
| 4,768,280 | 9/1988 | Palmer et al. . |
| 4,954,682 | 9/1990 | Baran et al. . |
| 5,035,042 | 7/1991 | Maitra et al. . |
| 5,140,123 | 8/1992 | Mitani . |
| 5,344,062 | 9/1994 | Krengel et al. ............ 228/147 |
| 5,474,227 | 12/1995 | Krengel et al. ............ 228/147 |

FOREIGN PATENT DOCUMENTS 3630625  9/1986  Germany .

Primary Examiner—P. Austin Bradley
Assistant Examiner—Jeffrey T. Knapp
Attorney, Agent, or Firm—Howard & Howard

[57] ABSTRACT

The method of forming a seamed metal tube having a metal coating of this invention includes applying a metal coating to the upper face of a metal strip prior to welding. The strip is then formed into an open seam tube and welded, preferably in a non-oxidizing atmosphere with the seam preferably located in the lower portion of the tube. Finally, at least a lower portion of said tube is reheated with the seam located in the lower portion of the tube, thereby causing the metal coating to flow downwardly over the seam, coating the seam. In one embodiment, the strip is preformed into an arcuate shape and coated, wherein the metal coating increases in thickness toward the lateral strip edges, such that the coating will flow over the seam following welding. The inside coated seamed tube may also be immersed in a galvanizing or metal coating bath to coat the outside of the tube. In a preferred embodiment, the inside and outside coatings comprise substantially the same metal and a single galvanizing bath apparatus is used to coat the inside and outside surfaces of the seamed tube. In another embodiment, the coating on the inner surface of the seamed tube has a melting temperature substantially below the melting temperature of the metal strip, but higher than the melting temperature of the outside metal coating. In another embodiment, a lance is provided having a free end which extends through the adjacent lateral edges of a tube-shaped strip and a nozzle which applies metal coating material over the seam. A control loop is also disclosed for improved reflow of the metal coating over the seam.

62 Claims, 6 Drawing Sheets

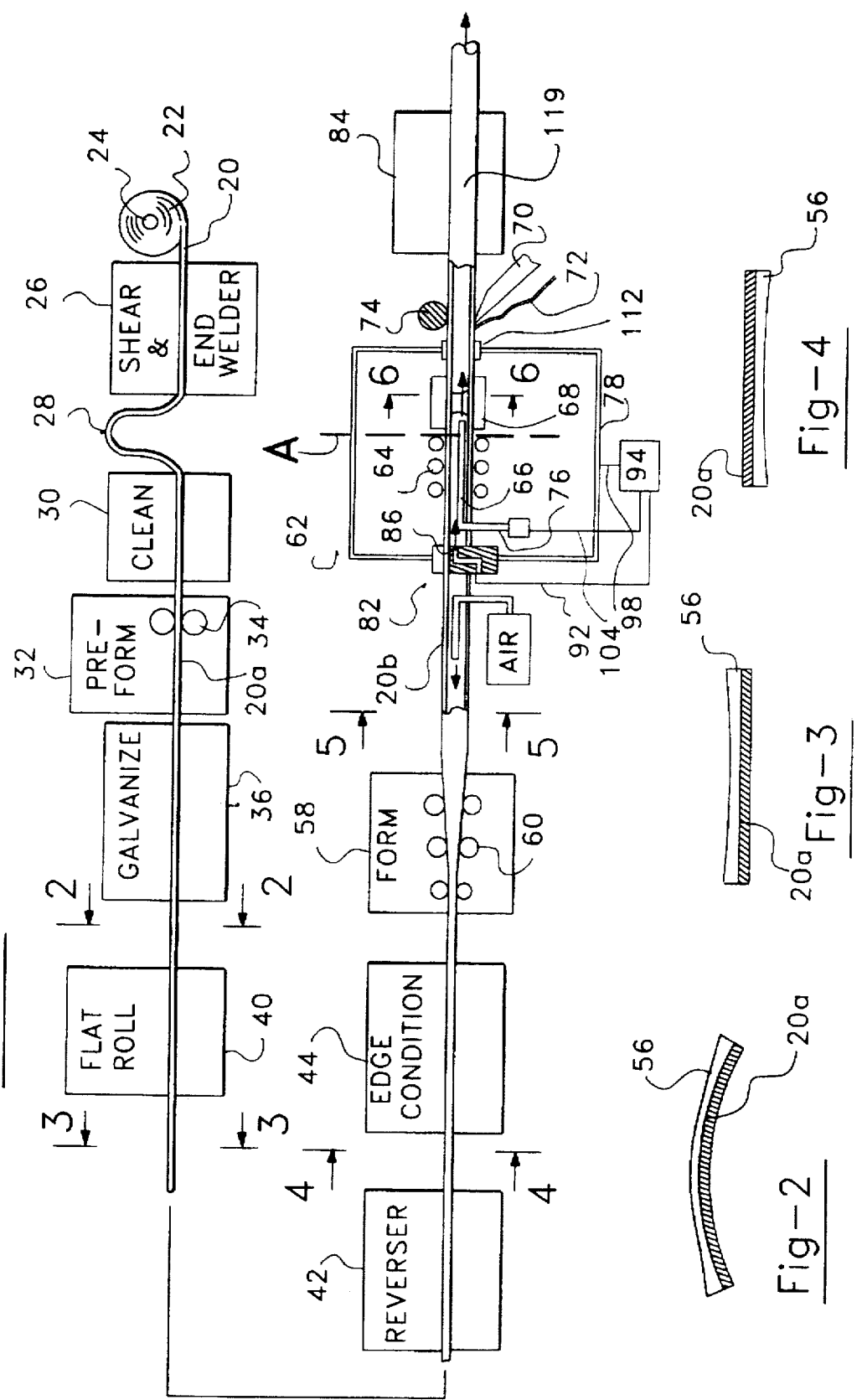

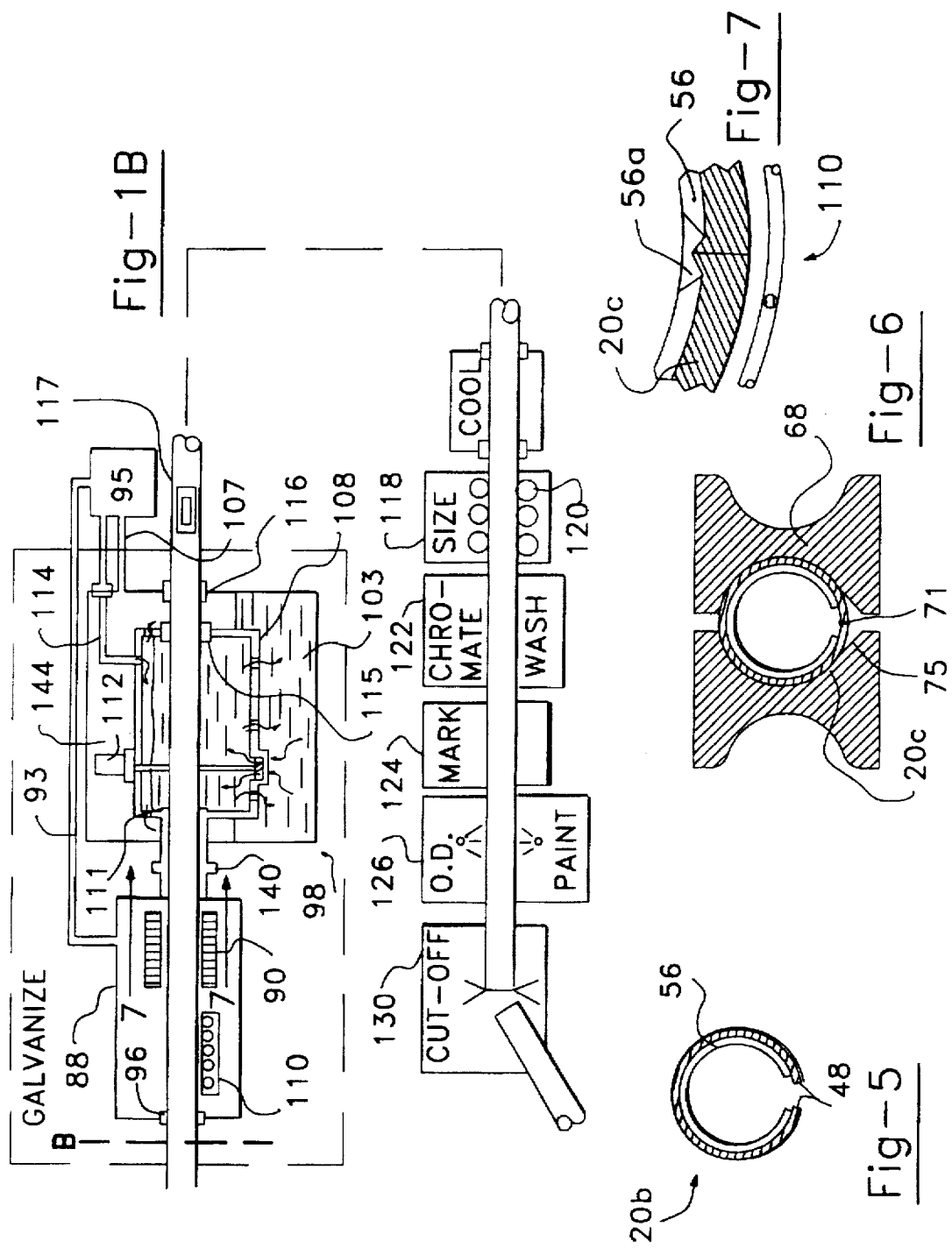

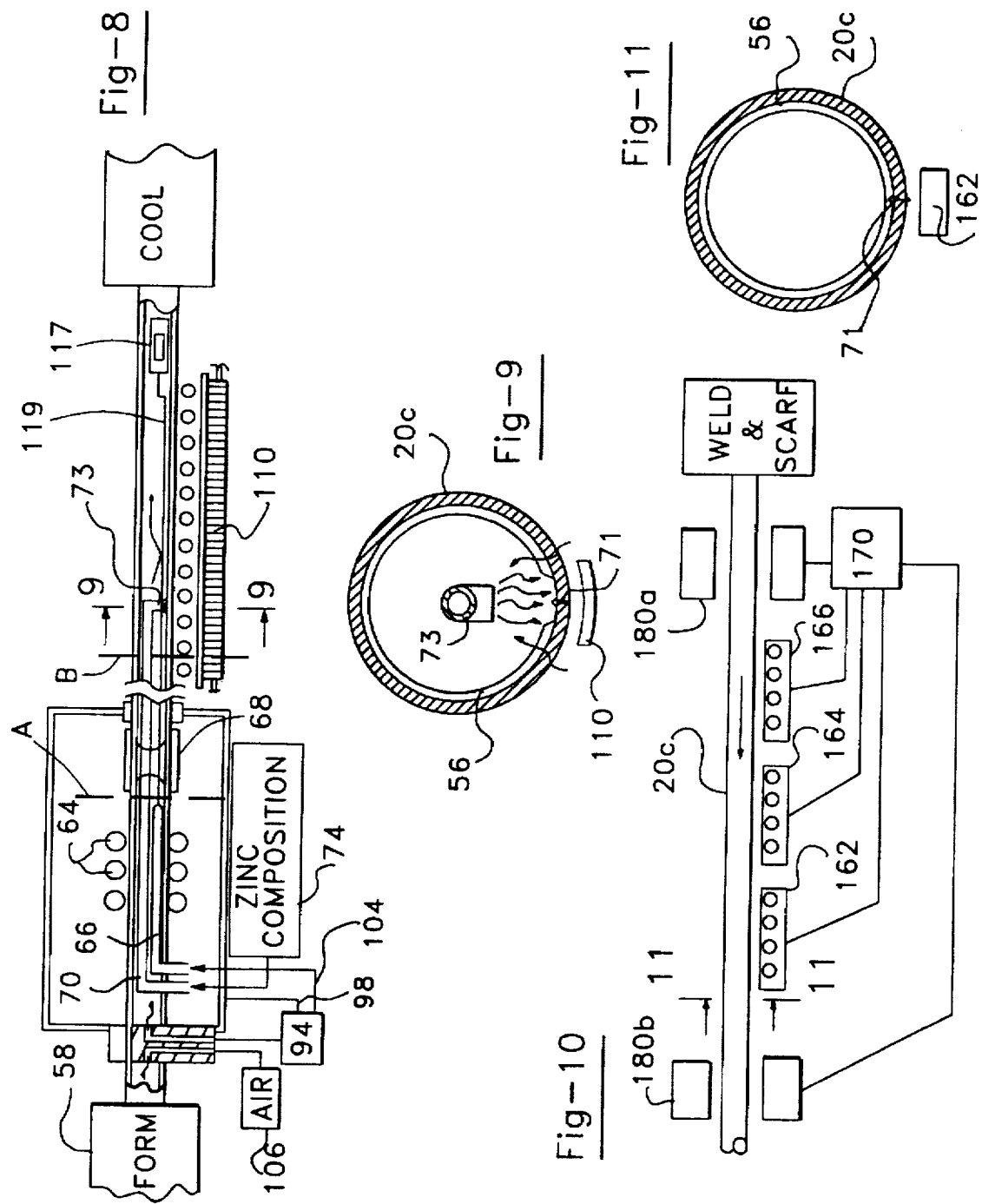

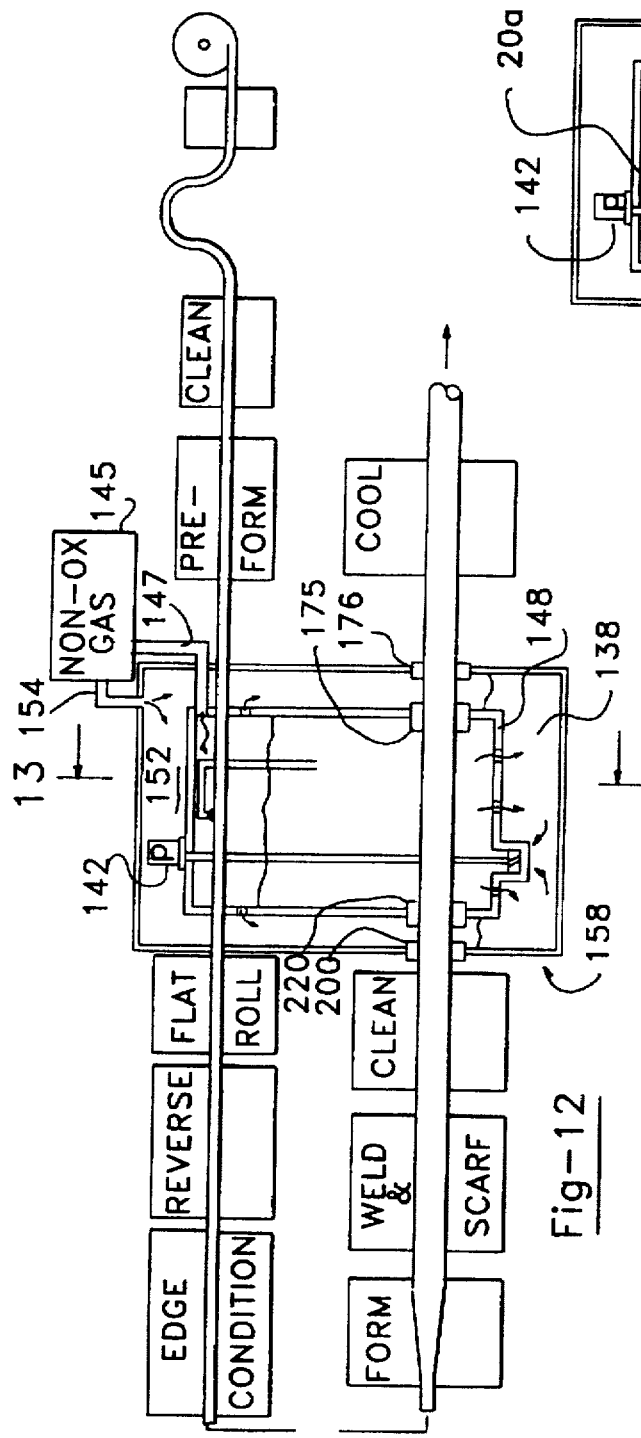
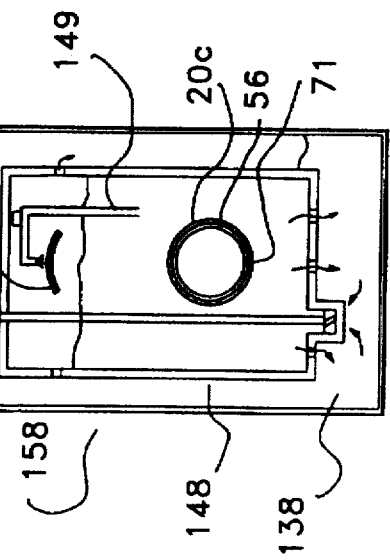
Fig-13
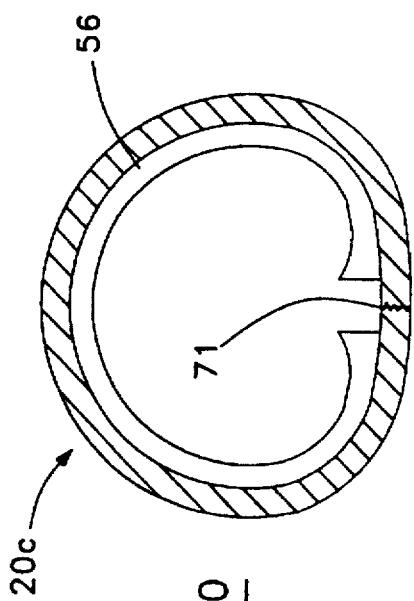
Fig-12
Fig-20

METHOD OF FORMING SEAMED METAL TUBE

RELATED APPLICATIONS

This application is a continuation-in-part application of U.S. Ser. No. 08/232,505, filed Apr. 25, 1994, now U.S. Pat. No. 5,474,227, which application is a continuation-in-part of U.S. Ser. No. 08/083,078, filed Jun. 24, 1993, now U.S. Pat. No. 5,344,062. This application is also a continuation-in-part of U.S. Ser. No. 08/083,099, filed Jun. 24, 1993 and PCT application Ser. No. PCT/U.S. 94/06938, filed Jun. 15, 1994.

BACKGROUND OF THE INVENTION

This invention relates to an improved method of forming a seamed metal tube having a metal coating. More particularly, the present invention relates to a process suitable for continuous or in-line processes for forming ferrous metal tubes coated with a protective metal coating, preferably, zinc, aluminum or copper and their alloys. It should be understood that the process can be applied to non-ferrous metal tubes, including, for example, brass.

Methods of continuously or in-line forming of a seamed steel tube from a continuous strip or skelp are well known. In a conventional tube forming mill, the continuous strip is first cleaned and conditioned, then rolled to form an open seam tube having nearly abutting edges at the top of the tube. The edges are then welded together by one of several conventional methods which generally include heating the edges and then either forging the edges together with squeeze rolls and/or flux welding the seam. The edges of the tube may be heated, for example by resistance welding, electric arc or by high frequency induction welding. High frequency induction welding is a form of electric resistance welding, wherein the open seam tube is received through an electric work coil which creates a strong magnetic field, which in turn induces a current to flow around the tube and in the "Vee" formed as the edges of the strip are welded. An impeder is generally located within the tube, which forces the current down the nearly abutting edges of the open seam tube, heating the tube edges to a hot forging temperature. The tube edges are then forged by squeeze rolls which drive the molten edges together to form an integral seam.

In-line galvanizing and coating or painting processes are also well known. The strip or skelp may be galvanized or painted on one or both sides prior to forming and welding, or the outside surface of the welded seamed tube may be galvanized by immersing the tube in a molten zinc bath. Where the strip is coated with a protective coating prior to seam welding, the coating will burn off or melt in the seam zone because the welding operation involves the melting of the tube material, which is generally steel. Thus, the temperature at the seam may be 2,300° F., or greater. Where the strip is coated with a metal, such as zinc or aluminum, the metal will melt during welding and flow downwardly away from the seam, which is located at the top of the tube. A zinc coating solution has also been used to paint the exterior surface of the seam. However, such coatings have poor adherence and are mainly cosmetic. "Metalizing" of the seam surface has also been attempted; such coatings are mainly mechanical and do not provide a metallurgical bond between the metals. The failure of the prior commercial processes to fully coat and thus protect the tube seam is evident by the fact that the weld area is generally the first to fail in accelerated corrosion tests. Metalized surfaces covering the exterior seam surface have been known to fail while incurring mechanical stresses associated with tube fabrication.

The continuous tube forming process and apparatus of this invention solves the above-identified problems and produces a superior metal coated tube. The process of this-invention assures a fully-coated welded seam without substantial additional costs and may be used with conventional tube forming processes and equipment.

SUMMARY OF THE INVENTION

As set forth above, the present invention relates to an improved tube forming and coating process and apparatus. The method of forming a seamed metal tube of this invention is particularly, but not exclusively adapted to a continuous process wherein the strip or skelp is coated on at least one face thereof with a metal coating prior to forming and welding. The metal coating comprises a metal coating material which is preferably zinc, aluminum, copper, their alloys or other metals or alloys which have a melting temperature preferably substantially below the melting temperature of the tube material. Zinc is the most common protective coating for ferrous tubes. When zinc is used herein as the metal coating, it is typically alloyed with from about 0.5% to about 1.25%, by weight, aluminum. Certain preferred embodiments described below will employ other alloys. Any reference in this application to zinc as the metal coating material or galvanizing is not intended to limit the present invention to zinc alone, unless specifically stated.

A preferred embodiment of a method of this invention includes coating the upper face of a metal strip or skelp with a metal coating, prior to forming, where the thickness of the metal coating is controlled to form a coating having a thickness which increases from a mid-portion of the strip toward the lateral edges. To achieve the thicker metal coating at the lateral edges of the strip, the strip may be preformed into a downwardly opening arcuate shape prior to applying the metal coating over the upper face of the metal strip. It will be understood, however, that the edges should be free of coating when the edges are welded. Thus, the metal coating may be removed from the edges following galvanizing by edge conditioning comprising either slitting the edges or otherwise removing the coating at the edges. Where the thickness of the metal coating increases toward the edges or the coating has sufficient thickness, it may be possible to obtain a reflow of the metal coating over the seam without reheating following welding, particularly where the edges are welded in a non-oxidizing atmosphere. However, it is preferred to include a step of reheating at least a lower portion of the tube to provide appropriate coating of the seamed surface.

The process then includes rolling and forming the strip into a tube-shaped strip or open seam tube having opposed spaced nearly abutting lateral edges which are preferably located in a lower portion of the open seam tube or the tube is turned following welding as described below. The process then includes heating and integrally welding the adjacent edges of the strip to form a tube having a welded seam preferably in the lower portion of the tube. The most preferred method includes inductively heating the opposed lateral edges of the strip by moving the strip continuously through an induction coil and then forging the edges together with squeeze rolls to form an integrally seamed tube having a welded seam oriented downwardly.

In the various embodiments of the invention herein, it is critical to locate the welded seam in a lower portion of seamed tube during a reheating step where the metal coating on the inside surface of the seamed metal tube melts and flows downwardly to the seam. In one preferred embodiment of the present invention, a metal coating disposed on the inner surface of the tube-shaped strip is built up adjacent the seam so that during the heating step the metal coating melts and flows downwardly over the seam to cover the seam. In another preferred embodiment of the method of this invention, metal coating material is sprayed onto the inner surface of the welded seam during the heating step wherein the coating material melts and covers the inside surface of the welded seam. The other process steps do not require that the spaced lateral edges of a tube shaped strip or the welded seam in a seamed metal tube be located in a lower portion thereof. However, it is preferable to orient the nearly abutting edges generally downwardly during the heating and welding process and the forging process steps.

In an alternative embodiment, the process of this invention may include forming and welding the strip in a conventional manner, wherein the skelp is rolled upwardly and the weld is initially located at or near the top of the tube. The method of this invention may also be used in a spirally welded tube, wherein the tube is reheated when the weld is located at the bottom of the tube. The method then includes inductively heating the opposed lateral edges of the strip by moving the strip continuously through an induction coil with the nearly abutting edges oriented generally upwardly and then forging the edges together with squeeze rolls to form an integrally seamed tube having a welded seam initially oriented upwardly. The tube is then "turned" to locate the welded seam in the lower portion of the tube prior to a reheating step.

The method of this invention may then include reheating at least a lower portion of the tube to the melting temperature of the metal coating, such that the molten metal coating flows downwardly and coats the seam. The metal coating on the inner surface of the tube flows downwardly and accumulates over the seam. In a preferred embodiment, the open seam tube is welded in a substantially non-oxidizing atmosphere and the seamed tube is reheated in a substantially non-oxidizing atmosphere to cause the metal coating to flow downwardly over the seam prior to oxidation of the molten seam. This is accomplished in the disclosed embodiment by enclosing the welding and reheating apparatuses in an enclosure and injecting a non-oxidizing gas under pressure into the enclosure to maintain a non-oxidizing atmosphere. As used herein, a "non-oxidizing" gas or atmosphere refers to a gas or atmosphere which eliminates, prevents or inhibits oxidation of the molten metal, such as the molten or semi-molten edges of the tube or the coating. The non-oxidizing gas may include what would generally be considered to comprise a reducing atmosphere where the gas reacts with metal oxides found in the metal strip at the elevated temperatures of the present process, thereby effectively removing oxides from the strip surface in preparation for reflow of the metal coating. The non-oxidizing gas may, however, keep the metal surface from forming oxides thereon at the elevated temperatures. Thus, the gas or atmosphere may be relatively inert, such as nitrogen, but may also include a reducing gas, such as hydrogen. The amount of hydrogen required for adequate reaction with the oxides may vary. However, where hydrogen is included, the percent of hydrogen should be relatively low (e.g., no more than about 10%) to avoid a potential explosion. A typical non-oxidizing atmosphere, thus, may include about 95% nitrogen and 5% hydrogen. The atmosphere, in an enclosure should be kept from reaching chemical equilibrium by allowing the non-oxidizing gas to escape the enclosure, preferably past the apex formed by the strip edges.

The introduction of hydrogen or other oxygen scavenging gas in the present invention improves the process by eliminating or preventing oxide formation at the tube surface. In a more general sense, however, the non-oxidizing atmosphere achieved in the present process may be considered inert. Because nitrogen is not completely inert and has been known to form nitrides in certain processes herein, argon may be substituted for part or all of the nitrogen gas herein, particularly in the processes involving coating the exterior surface of the seamed metal tube. Since argon is heavier than oxygen, argon is particularly useful in processes including blanketing an inner surface of a tube with the seam in a lower portion of the tube. Argon will displace oxygen at the seam and form a blanket of non-oxidizing atmosphere at the seam.

The process may then include scarfing excess welded seam material from the outside surface of the seamed metal tube to provide a smooth outer surface. A preferred embodiment of a method of this invention includes double scarfing the outside surface of the seamed metal tube in an area adjacent the welded seam. The first scarfing step comprises the seamed tube over a scarfing tool while the area adjacent the welded seam is still "red-hot". The tube is then immediately quenched to lower the temperature of the welded seam to a temperature where the propensity to oxidation is significantly lowered, e.g., less than 300° F. The tube is then passed over a second scarfing tool, which may comprise a wire brush apparatus. This process removes oxides at the outside surface of the weld and promotes reflow of the metal coating over the outside seam surface. In a preferred embodiment of this method, a flux is misted or sprayed onto the outside surface of the seam prior to reflowing the metal coating over the outside seam surface. The flux may assist in removing oxides at the surface, thereby improving reflow of the metal coating material over the outside seam surface.

A preferred embodiment of a method of this invention includes immersing the seamed metal tube in a galvanizing bath containing molten metal after welding and reheating the tube where the outer surface of the seam is coated with the metal. In one alternative embodiment, the inside and outside coatings over the seam comprise zinc and a single galvanizing tank is used for coating the upper face of the metal strip and the outside surface of the metal tube. Another alternative embodiment of a method of this invention includes coating the upper face of the metal strip with a metal having a melting temperature substantially lower than the melting temperature of the metal strip, but higher than the melting temperature of the metal coating used to coat the outside surface of the seamed tube. For example, the upper face of the metal strip which later forms the inside surface of the seamed tubes may be coated with a zinc alloy and the outside surface of the seamed tube may be coated by immersing the seamed tube in a galvanizing bath containing molten zinc alone. The outside zinc coating flows downwardly over the outside surface of the seam; however, the inside coating of the seamed tube, e.g., Zn/Al alloy, is not disturbed during the outside coating step of this method because the melting temperature of the inside coating is greater than the galvanizing bath (e.g., zinc) melting point temperature.

In certain applications, it may also be desirable to add a metal coating material containing metal particles or powder to the inside surface of the tube, which then becomes part of the coating when the coating is melted and reflowed downstream of the weld zone. The metal powder or particles have a melting temperature substantially below the melting temperature of the tube material and may be suspended in a conventional fluxing agent, which serves as a binder. The metal coating material may be applied using a lance which extends up through the spaced adjacent lateral edges of the tube-shaped strip and downstream of the welding zone to a nozzle which sprays the coating material down over the seam. The coating material may also be added in the form of wire, ribbon or foil. The metal coating material may be the same as the metal coating on the inner or outer surface of the tube or may comprise an alloy thereof. When the coating material includes flux, the tube is reheated and the fluxing agent reduces any oxides at the seam and evaporates. The metal powder will collect on or adjacent the seam, where it is melted when the temperature reaches the melting temperature of the coating metal to cover the seam. The coating material may exclude the fluxing agent, particularly when the end use for the seamed metal tube is, for example, water-carrying pipe. The coating metal powder can be pushed through the lance by blowing an inert or non-oxidizing gas through the lance. Other methods of applying coating metal to the inside surface of the seams are also described. Preferably, a non-oxidizing atmosphere should be maintained adjacent the coating step.

A preferred embodiment of the method of this invention includes providing a control loop including a plurality of staggered heating coils, a control means and an ultrasonic measuring system which helps to maintain a smooth, uniform metal coating over the inner surface of the seam. The ultrasonic measuring system measures the thickness of the metal coating over the seam. The control means receives, collects and compares the data provided by the ultrasonic measuring system and controls the heat emitted by the heating coils to regulate the reflow of the metal coating over the seam. This control is particularly important in commercial applications where the speed of the line, tube thickness and composition varies with time. In an alternative embodiment, a temperature measuring system is used in place of the ultrasonic measuring system to maintain a desired temperature and thus help control the inside metal coating reflow.

Other advantages and meritorious features of the continuous tube forming and coating process of this invention will be more fully understood from the following description of the preferred embodiments, the claims, and the drawings, a brief description of which follows.

BRIEF DESCRIPTION OF THE DRAWINGS

FIGS. 1A and 1B are a schematic flow diagram illustrating a preferred embodiment of a continuous tube forming and coating process of this invention;

FIG. 2 is a cross-sectional view of a metal strip following preforming and galvanizing steps in the direction of view arrows 2—2 of FIG. 1A;

FIG. 3 is a cross-sectional view of the metal strip following a flat roll step in the direction of view arrows 3—3 of FIG. 1A;

FIG. 4 is a cross-sectional view of a flat metal strip following a reversing step in the direction of view arrows 4—4 of FIG. 1A;

FIG. 5 is a cross-sectional view of a tube-shaped strip or open seam tube formed by the process in the direction of view arrows 5—5 of FIG. 1A;

FIG. 6 is a cross-sectional view of the tube forming step by squeeze rolls with the welded seam at the bottom of the tube in the direction of view arrows 6—6 of FIG. 1A;

FIG. 7 is a partial cross-sectional view of the welded tube following reflow of the interior metal coating over the seam in the direction of view arrows 7—7 of FIG. 1B;

FIG. 8 is a partial schematic diagram illustrating a preferred embodiment of the welding and coating steps of a tube forming and coating process of this invention;

FIG. 9 is a cross-sectional view of the welded tube during a coating step of the process in the direction of view arrows 9—9 of FIG. 8;

FIG. 10 is a partial schematic diagram illustrating a preferred embodiment of the coating step of a tube forming and coating process of this invention;

FIG. 11 is a cross-sectional view of the tube coating step and apparatus of FIG. 10 in the direction of view arrows 11—11;

FIG. 12 is a partial schematic flow diagram illustrating a preferred embodiment of the coating step of the tube forming and coating process of this invention;

FIG. 13 is a cross-sectional view of the tube of FIG. 12 in the direction of view arrows 13—13;

FIG. 20 is a cross-sectional view of a tube with a flattened lower portion of the tube in accordance with a preferred embodiment of the process herein.

DETAILED DESCRIPTION OF THE PREFERRED EMBODIMENTS OF THE INVENTION

Figure 14:
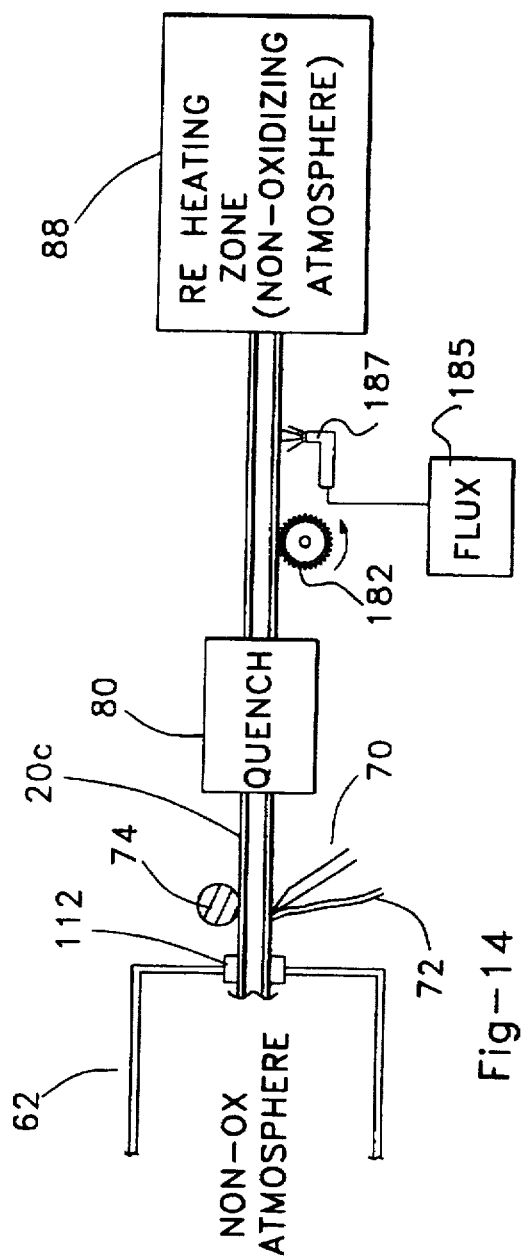
FIG. 14 is a partial schematic flow diagram illustrating a preferred embodiment of a dual scarfing step of a tube forming and coating process of this invention.

As shown in the schematic flow diagram of FIGS. 1A and 1B and described above, the tube forming and coating process of this invention is particularly, but not exclusively adapted to the processing of endless lengths of untreated strip steel or skelp, such as normally processed by a continuous tube forming mill. Although the process is generally described in terms of forming coated ferrous metal robes, it should be understood that the process can be applied to non-ferrous metal tubes, including, for example, brass. Improvements described herein can be used with pre-coated strip, wherein a metal coating is applied to one or both surfaces of the strip prior to processing. Further, the improvements described herein can also be used in a batch or non-continuous process and the tube may be formed of other metals or alloys. The process of this invention will, however, be described in relation to the continuous process disclosed in FIGS. 1A and 1B.

Metal strip or skelp, generally strip steel, 20 is supplied to the tube forming mill in coils 22, which are mounted on a pay-out reel 24. The coil is mounted for free rotation on the reel 24 as required by an continuous tube forming mill. As will be understood by those skilled in the art, the strip is processed by the mill substantially continuously at a constant rate. The advancement of the flat strip or skelp 20 through the mill is effected primarily by engagement between the strip and the forming and sizing rolls which rotate at a relatively constant speed. The strip 20 is thus drawn into the mill from the pay-out reel 24.

Because of the length of each coil 22 of strip steel is taken up by the mill in a relatively short time, means must be provided for splicing the end of one coil to the next, which is accomplished at the splicing station 26. In the splicing station 26, the end of the coil being processed in the mill is sheared or cut to provide a square end and the end is then welded to the beginning of the next reel. A conventional accumulator 28 in the form of a loop of strip is provided having sufficient length to continuously feed the strip to the mill while the trailing end of the coil is held stationary for shearing and welding. The loop may be formed by feeding the strip over a series of rolls (not shown) which are mounted to freely rotate, as is well-known in the art. When the splice is complete, the strip is again paid-out over the accumulator rolls for the next splicing operation when the next reel is exhausted.

Because the coil of skelp is received by the mill normally includes oil and may include other contaminants, it is generally necessary to clean and prepare the strip prior to coating, which in the disclosed process is accomplished at the cleaning station 30. In a typical application, the strip is cleaned and prepared with alkaline washes and intermediate thorough water rinses. In the disclosed process, the strip is also dried. The cleaned strip is now ready for coating or galvanizing.

The strip may be pre-formed if desired in a pre-form station 32 having a plurality of rolls 34 which form the strip into a desired shape, such as an arcuate shape as described, for example, in U.S. Pat. No. 3,696,503 of Krengel et al., the disclosure of which is incorporated herein by reference. The strip is formed by a series of forming rolls which have a configuration and number sufficient to form the strip into the desired shape, including rolls which engage the upper and lower surfaces of the strip. By forming the strip into an arcuate shape, the amount of metal coating, e.g., zinc, which will adhere to the surface will be that necessary to obtain a coating that will be strongly bonded to the surface of the strip having a desired thickness, good coverage and a good appearance. For example, where the strip is pre-formed into a downwardly opening arcuate shape, the coating will be thicker adjacent the edges, which is advantageous in the process of this invention.

In one disclosed embodiment, the process of this invention comprises coating only one side of the strip, wherein the coated surface is located on the inside surface of the tube when formed, as described below, into an open seam metal tube. The method or process of this invention may be utilized with pre-coated strip, wherein one or both surfaces of the strip are coated with a metal coating comprising a metal coating material, e.g., zinc, having a melting temperature substantially lower than the melting temperature of the tube, as described above. Where a pre-galvanized strip is utilized, the pre-conditioning, cleaning and processing of the strip prior to welding may not be required. However, where, for example, the pre-galvanized strip has been oiled to protect it from oxidation, pre-conditioning and cleaning may still be required.

The strip 20a may then be advanced through the metal coating or galvanizing tank 36 where molten zinc or other metal coating material is applied over the top face of strip 20a. The strip 20a may also be immersed in molten metal in a conventional manner as described, for example, in the above-referenced U.S. Patent of Krengel et al. However, since the outside of the tube may be coated later in the disclosed process, it is not necessary to coat both faces of the metal strip 20a. Having preformed the strip 20a into a downwardly opening arcuate shape, as described above, the metal coating on the arcuately shaped strip flows downwardly toward the lateral edges of the strip, such that the thickness of the metal coating increases from the midportion toward the edges, as shown in FIG. 2.

In a preferred embodiment of the invention herein, the molten metal in galvanizing tank 36 will comprise an alloy having a melting temperature substantially below the melting temperature of the metal strip 20 but higher than the melting temperature of the metal used to coat the outside of the seamed metal tube. The alloy is preferably an alloy containing zinc, more preferably a zinc/aluminum alloy. A suitable zinc alloy contains from about 5% to about 55%, by weight, aluminum. The commercially available zinc alloys sold under the tradenames Galvalum™ and Galfan™ are useful herein. Galvalum™ contains about 55% aluminum, 45% zinc, and other minor ingredients. Galfan™ contains about 95% zinc and about 5% aluminum and may include misch metal. In galvanizing tank 36, the metal coating 56 is applied to the upper face of the metal strip 20, which will form the inner surface of the open seam tube. This metal coating will coat the inner surface of the seam in the seamed metal tube when the tube is reheated to reflow the coating over the seam. In a later step, the seamed metal tube may be dipped in a second galvanizing tank containing a lower melting temperature metal, which will coat the outer surface of the tube including the seam. By coating the inner surface of the seam with a higher melting temperature metal, the outer surface of the seam can be coated without disturbing the coating over the inner surface of the tube including the seam. In a most preferred embodiment herein, for example, the metal alloy in galvanizing tank 36 comprises an alloy of zinc and aluminum, e.g., Galvalum™; whereas, the metal used to coat the outside of the seamed metal tube may comprise zinc.

The strip 20a may then be advanced through a flat roll 40 where the strip is contoured to a substantially flat form. This flattening is performed in preparation for forming of the metal strip into an open seam tube, as described below. Since the strip 20a may be formed later in the process such that the metal coating is located on an inner surface of the open seam tube, as described below, it is desirous to first reshape the metal strip 20a back to its original form, i.e., substantially flat. Upon flattening, the metal coating 56 is located on the upper surface of the metal strip 20a and the coating will be thicker adjacent the edges of the strip, as shown in FIG. 3.

In a preferred embodiment of the invention herein, the metal strip 20a and coating 56 are formed into an open seam tube having adjacent or nearly abutting lateral edges with the metal coating on the inside face of the metal strip with the open seam at the bottom of the tube. Therefore, the metal strip 20a should be advanced through a reverser station 42 where the metal strip and coating are inverted locating the metal coating 56 below the metal strip 20a, as shown in FIG. 4. Devices for inverting sheet material like the strip 20a are known in the art and generally comprise a series of spaced rollers (not shown) which bend the strip to transpose the opposed faces of the strip. In an alternative embodiment, the metal strip 20a may be "flipped", for example, by locating the downstream stations, i.e., stations 44 and 58, below the flat roll station 40.

In an alternative embodiment, the strip and coating may be formed and welded with the seam in the upper portion of the tube and later "twisted" to locate the seam in the lower portion of the tube, as described in our copending application Ser. No. 08/232,505, the disclosure of which is incorporated herein by reference. In this alternative process, the metal strip 20a is not advanced through a reverser and the coating 56 is left on the upper face of the metal strip 20a, as described in further detail below.

In a conventional mill, the strip 20 as received on the reel has a width which is slightly greater than the width required to form the tube, such that an edge is available on each side of the strip for proper sizing of the tube and to provide freshly cut metal at the abutting edges forming the seam of tube. The side edges of the strip will normally be coated with metal from the galvanizing tank 36. If the metal coating is not removed from the side edges of the strip 20a, the metal coating may melt and flow onto the weld during welding. This may cause the metal coating 56 to vaporize and may deposit contaminants at the weld which may prevent the metal coating to flow over the weld and adhere to the weld during a later reheating step. Thus, it is preferable to remove the metal coating from the side edges prior to welding, particularly where the edges of the open seam tube are joined by induction welding. A conventional edge shaver or slitter may be used in the edge conditioning station 44, which may be used to cut a square edge. More preferably, a chamfered edge, as described in the above-referenced related U.S. Pat. No. 5,344,062 of Krengel et al., may be furnished to provide relief for the forged upset and assure good welding contact between the edges in the welding operation described below. This edge shaving removes impurities at the surface to provide a better coating surface for the metal coating and provides a well for receipt of coating material. The edge shaving also removes coating material adjacent the lateral edge 48, thereby minimizing or eliminating burn-off or vaporization of metal coating 56 during welding and deposition of contaminants from such burn-off or vaporization at the weld. In an alternative embodiment, coating material 56 adjacent the lateral edges 48 may be removed without removing a significant amount of strip material, e.g., scraping the metal coating 56 from the lateral edges 48. Following edge conditioning, the metal coating 56 has been removed from the lateral edges 48 of the arcuate strip and the metal coating 56 preferably increases in thickness from the mid-portion toward the lateral edges 48.

Figure 15:
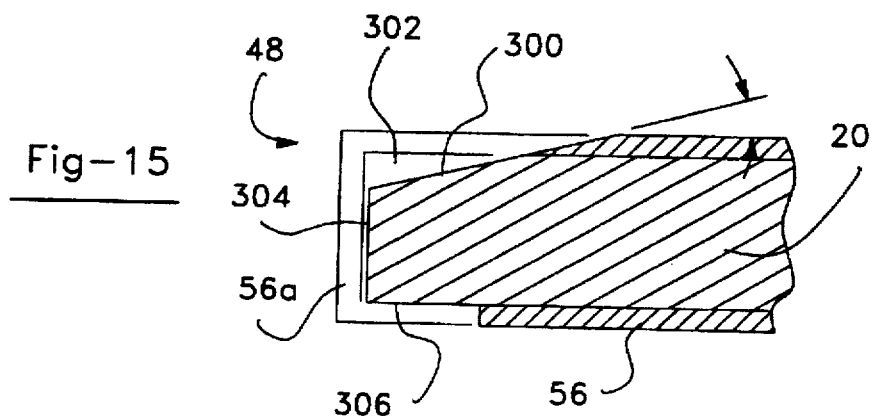
FIG. 15 is a partial end cross-sectional view of one lateral edge of the strip following edge conditioning.

FIG. 15 illustrates one preferred embodiment of a lateral edge 48 of the strip 20 following edge conditioning at station 44 in FIG. 1A. As shown, the metal coating 56 has been removed from the edges 48 as shown in phantom to expose the edges of the metal strip 20. In the preferred embodiment of the lateral edge 48 shown in FIG. 15, the inner edge 300 is preferably cut at an angle α, as shown, removing a triangular portion 302 of the metal strip 20 and the metal coating 56a. More preferably, edge 300 is arcuately cut to prevent formation of thinner coating at the apex 303. The end or edge 304 is cut square to the strip and the outer surface 306 is exposed, as shown. As used herein, "inner" refers to the surface of the strip which forms the inner surface of the tube and "outer" refers to the surface of the strip which forms the outer surface of the tube.

In the disclosed embodiments, the metal coating 56 covering the inner and outer surfaces of the strip 20 is preferably removed to expose or bare the steel strip adjacent the edges 304, such that less of the metal coating 56 is burned-off or vaporized during welding and deposition of contaminants at the weld is minimized or eliminated. The ends 304 are preferably square and exposed to assure a good weld. Finally, the inner surfaces 300 adjacent the ends 304 are preferably formed to define an inner concave depression or well in the tube which receives the metal coating as the molten coating metal flows downwardly over the weld or seam inside the tube, as described below. In another embodiment, an outer edge may be cut to remove contaminants that would inhibit flow of the metal coating over the seam surface. Alternatively, the metal coating 56 may be scraped away from the lateral edges of the strip 20a prior to welding. As described above, the strip 20 may be flat or preformed into an arcuate shape 20a as shown in FIG. 2.

Figure 16:
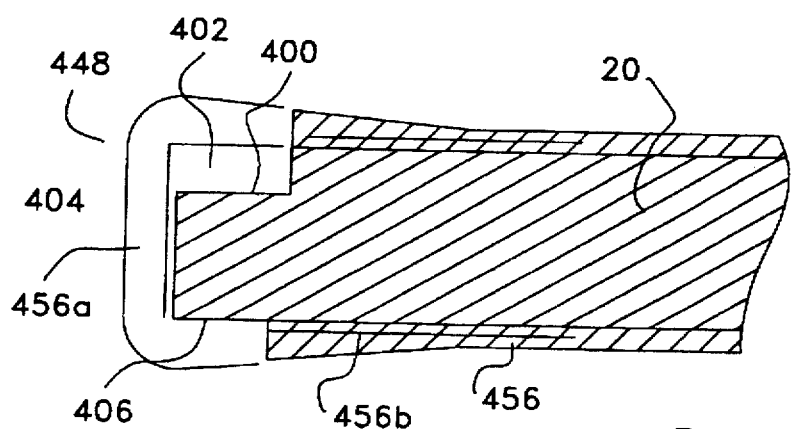
FIG. 16 is a partial end cross-sectional view of a second embodiment of the lateral edge of the strip following edge conditioning.

FIG. 16 illustrates an alternative preferred embodiment of the lateral edge 448 of the strip 20. As described above in regard to FIG. 15, the metal coating 456a covering the inner and outer surfaces of the strip 20 are preferably removed to bare the steel strip adjacent the ends 404, such that less of the coating 456 is burned-off or vaporized during welding. In the embodiment shown in FIG. 16, however, the metal coating 456 increases in thickness toward the edges 448, which is shown somewhat exaggerated in FIG. 16. As described above, this provides more coating metal to reflow over the welded seam in the process of this invention. The desired overall thickness of the metal coating is shown in phantom at 456b. A portion 402 is removed from the steel strip at the edge conditioning station 44 (FIG. 1A), such that the exposed surface 400 forms a well or concave depression adjacent the welded seam which receives molten coating metal as described above. The ends 404 are preferably relatively flat and generally transverse to the inner and outer surfaces of the strip 20 to assure a good weld without disposition of contaminants at the weld and the outer surface 406 is exposed to limit vaporization of the metal coating as described above.

Figure 17:
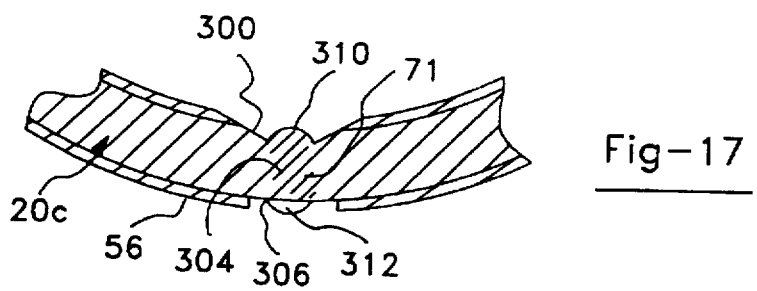
FIG. 17 is a partial end cross-sectional view of a seamed tube formed from a strip which was edge conditioned as shown in FIG. 15.

FIG. 17 illustrates the tube 20c adjacent the seam 71 following welding. The embodiment of the seamed tube 20c shown in FIG. 17 was formed from a strip having chamfered or inwardly angled surfaces 300 adjacent the welded seam 71 as described above in regard to FIG. 15. As will be understood by those skilled in the art, the forging of the molten edges 304 by the squeeze rolls 68 results in upset flashes on the inner and outer surfaces of the tube. The outer flash 312 is removed by a scarfing tool 70; however, the inside flash 310 (exaggerated in this figure) cannot be scarfed or removed by conventional means. As described above, the height of the inside flash 310 can be reduced by chamfering the inside surface adjacent the lateral edge as shown at 300 in FIG. 15 or by providing a reduced thickness portion as shown at 400 in FIG. 16. Further, the chamfered surface 300 guides the molten metal of the coating 56 downwardly to the upset portion 310 of the seam 71 and provides a clean surface and a well for receiving the molten metal during a reheating process step.

Following edge conditioning station 44, the strip 20a may be preformed in a second preform station (not shown) having a plurality of rolls which form the strip into an arcuate shape as described, for example, in the above-referenced U.S. Pat. No. 3,696,503 of Krengel et al., and in substantially the same manner as described above in the first preform station 32. In this preform station, the metal strip 20a is formed into a downwardly opening arcuate shape with the coating below the metal strip 20a.

As shown in FIG. 5, the metal strip 20a is then rolled into a tube-shaped strip or open seam tube 20b having adjacent or nearly abutting lateral edges 48 at the forming station 58. The metal strip is progressively formed into an open seam tube as it passes between rolls 60. The rolls are rotatively supported on vertical and horizontal axles (not shown) in a conventional manner. In the preferred tube forming and coating process of this invention, the lateral edges of the strip are deformed or bent downwardly and inwardly toward one another as the tube is formed, rather than upwardly as in a conventional tube forming mill. The lateral edges of the strip 48 are then rolled into nearly abutting relation at the lower portion of the open seam tube 20b; however, the adjacent lateral edges 48 are slightly spaced. The open seam tube 20b is then received in the tube welding station 62, where the lateral edges of the strip are welded, as described below.

Figure 18:
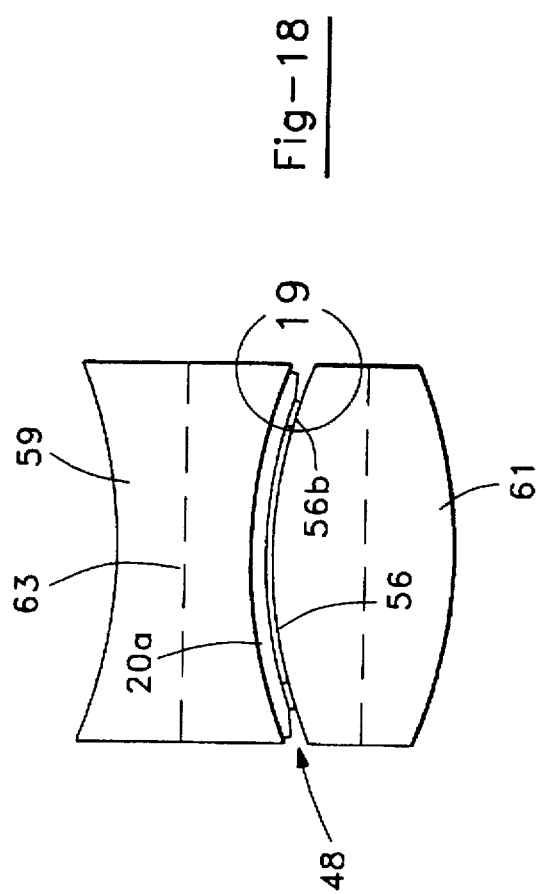
FIG. 18 is a cross-sectional view of a preferred embodiment of a forming step of a tube forming and coating process of this invention.

As shown in FIG. 18, a preferred embodiment of a strip forming apparatus of the present invention utilizes forming rolls to shape the metal strip into a tube-shaped strip while adding additional coating material to adjacent the lateral edges of the strip. Metal strip 20a is passed between forming rollers 59 and 61 in forming station 58. The rollers are rotatively supported on horizontal axles 63 in a conventional manner. Rollers 59 and 61 apply significant pressure on the opposed faces of metal strip 20a to progressively form metal strip 20a such that the lateral edges 48 of the metal strip are brought closer together while forming an open seam tube or tube-shaped strip. A ribbon of coating material 56b is added to metal strip 20a by disposing the ribbon between a face of strip 20a and roller 59 or 61. In FIG. 18, ribbon 56b is disposed between roller 61 and strip 20a adjacent the lateral edges 48 of strip 20a. The pressure applied by rollers 59 and 61 presses metal coating material ribbon 56b onto the metal strip adjacent a lateral edge 48 thereof.

Figure 19:
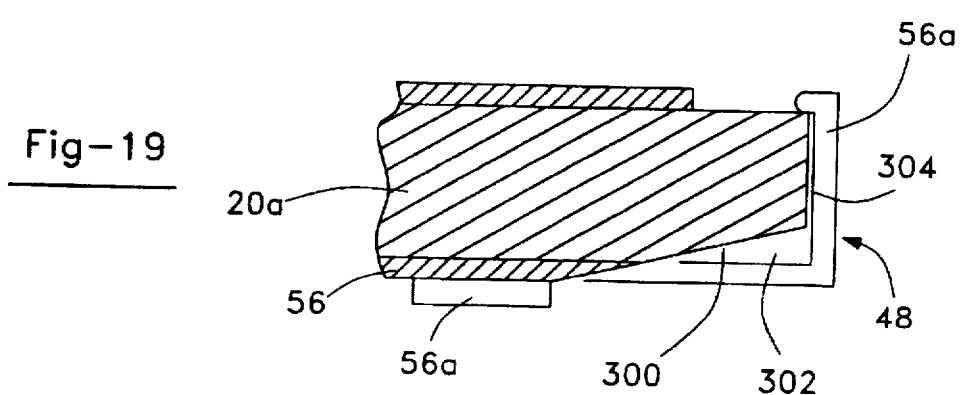
FIG. 19 is a partial end cross-sectional view of one lateral edge of the strip following the forming step of FIG. 18.

FIG. 19 illustrates one preferred embodiment of a lateral edge 48 of the strip 20 during forming at station 58 in FIG. 18. As shown, the metal coating 56 has been removed from the edge 48 as shown in phantom to expose the lateral edge 304 of the metal strip 20a. The inner edge 300 has been cut, as shown, removing a triangular portion 302 of the metal strip 20a and the metal coating 56a. The end or edge 304 is cut square to this strip. The metal coating covering a surface of the metal strip 20a has been removed to expose the steel strip adjacent the edges 304, such that less of the metal coating 56 is burned off or vaporized during welding and deposition of contaminants at the weld is minimized or eliminated. Additional coating material 56b in the form of a ribbon has been added and pressed onto coating material 56. The additional metal coating material may be added adjacent the lateral edges 48 of the strip on either face (or both) of the strip, thereby providing additional coating material adjacent the seam surface on the inside or outside of the seamed metal tube. The additional coating material 56b may be reflowed in a reheating step, described below, providing better coverage of the welded seam surface in the seamed metal tube.

The preferred embodiment of the tube welding apparatus of this invention utilizes high frequency induction to heat the opposed lateral edges of the open seam tube 20b. As shown in FIG. 1A, the induction welding apparatus includes a work coil 64 which is connected to a source of high frequency alternating current (not shown). The work coil 64 creates a strong magnetic field, which in turn induces current in the open seam tube adjacent the work coil. An impeder 66 is located within the open seam tube 20b. The impeder 66 includes a support or bracket portion 76 which extends upwardly between the opposed adjacent lateral edges 48 of the open seam tube 20b. A conventional induction welding impeder consists of a non-metallic tube surrounding one or more ferrite rods. Water or mill coolant is circulated over and past the ferrite rods to remove the heat produced by magnetic hysteresis and eddy current losses. At the frequencies used for induction welding (typically 200 to 800 kHz), current flows around the tube and along the "Vee" formed by the approaching edges of the strip, heating the edges to a hot forging temperature, whereby the edges are at least partially melted. As will be understood by those skilled in the art, ferrous tube, usually a heavy wall product, is being welded at lower frequencies down to 60 KHz. The lower the frequency, the wider the zone of the tube heated. In the process of this invention, however, it is preferable to limit the zone heated above the melting temperature of the coating to reduce coating loss, particularly where the seam is initially located at the top of the tube, as described in an alternative embodiment below. The edges are then forged together by squeeze rolls 68, as shown in FIG. 6, forming an integral seam 71. Preferably, squeeze rolls 68 have a notch 75 (exaggerated for clarity) located adjacent the welded seam 71 of tube 20c during the welding process step, particularly where tube 20c contains an outer coating thereon to prevent molten zinc from depositing on squeeze roll 68. Where the strip is steel, the temperature of the edges will be about 2300° F., or greater. The seamed tube 20c then passes over a scarfing tool 70 which removes the flash 72 from the outer portion of the seam, as shown in FIG. 1A. A back-up roller 74 engages the opposed surface of the tube, counteracting the pressure of the scarfing tool 70.

A preferred alternative embodiment of the tube welding apparatus of this invention utilizes an AC or DC welding apparatus known in the art in place of the induction welding apparatus. AC or DC current is applied to the opposed sides of the metal tube and delivers opposite polarity to adjacent the abutting edges of the open seam tube, thereby heating the edges to a hot forging temperature where the edges are at least partially melted. The use of such AC or DC welding technique eliminates the requirement for an impeder inside the tube. This provides for more room in the tube, thereby making it easier to perform other steps in the tube, e.g. lay down additional coating material to coat the inside surface of the tube, described below. In an AC or DC welding apparatus, the lateral edges 48 can be forged together by squeeze rolls 68 much closer to where the lateral edges are heated to a forging temperature than in the induction welding apparatus described above. Thus, maintaining a non-oxidizing atmosphere adjacent the weld zone, as described below, is more easily accomplished in an AC or DC welding apparatus.

In a preferred tube welding and coating process of this invention, the edges of the open seam tube are welded in a non-oxidizing atmosphere. In the embodiment of the tube welding station 62 in FIG. 1A, the welding apparatus is enclosed within an enclosure 78. The enclosure 78 may comprise a simple jacket through which the tube 20b is received and where at least the inside and preferably the outside, of the metal tube 20b is maintained in a non-oxidizing atmosphere. However, the open seam tube 20b is preferably received in the enclosure through a gas seal 82 such as described in the above-referenced related U.S. Pat. No. 5,344,062 of Krengel et al, the disclosure of which is incorporated herein by reference. The primary purpose of conducting the heating and welding step in an enclosure containing a non-oxidizing atmosphere is to protect the inside surface of the seamed tube, particularly the inside surface of the seam, against oxidation. Such oxidation may prevent the metal coating from reflowing over the welded seam surface. By providing a non-oxidizing atmosphere, the non-oxidizing gas should blanket the welding area with a non-oxidizing gas. In the process where the seam is located in a lower portion of the tube, the non-oxidizing gas preferably comprises a gas which is heavier than oxygen, e.g. argon. Since the weld is located in a lower portion of the tube, the step of introducing the argon in the weld area will cause argon to displace the oxidizing gas located in the weld area and blanket the weld area in a non-oxidizing atmosphere.

As used herein, a "non-oxidizing" gas or atmosphere refers to a gas or atmosphere which eliminates, prevents and/or inhibits oxidation of the metal strip, including what would generally be considered to comprise an inert atmosphere (e.g., nitrogen) or reducing (e.g. hydrogen) atmosphere, as disclosed above.

The gas seal 82 includes an inner plug which may be formed of a friction resistant thermoset plastic or a ceramic, such as reinforced nylon, which received the open seam tube 20b. The body portion of the plug is generally cylindrical having an outside diameter which is nearly equal to the inside diameter of the open seam tube, to be closely received within the tube. The plug includes a relatively thin radial support portion which is received between the edges of the open seam tube. A gas port 86 extends through the support portion into the plug body portion having an outlet which injects a non-oxidizing gas into the open seam tube. Line 92 connects a source of non-oxidizing gas 94 to the inlet in the support portion of the gas plug of the gas seal 82. A fiber, ceramic or plastic outer seal closely receives the outer surface of the open seam tube 20b, providing a seal for the open seam tube as it enters the non-oxidizing atmosphere in the enclosure 78. Non-oxidizing gas is also injected through line 98 into the enclosure 78 to produce a substantially non-oxidizing atmosphere in the enclosure 78. Non-oxidizing gas is also injected into the impeder through line 104, which is connected to the bracket 76 of the impeder. In the disclosed embodiment, the tube is dried and cleaned prior to receipt in the non-oxidizing enclosure 78 by an air blower 106 which blasts warm air into the open seam tube 20b. The blower dries the tube and blows small debris out of the tube through the spaced lateral edges 48. The seamed tube 20c then exits the non-oxidizing atmosphere chamber 78 through seal 112, which may be a gas seal as described below. A cylindrical plug 117 is attached to the end of impeder 66 by a tether 119. Plug 117 reduces or minimizes the escape of non-oxidizing gas from inside the seamed tube. In processes using an AC or DC welding apparatus, plug 117 must be attached to a bracket suspended within the open seam tube 20b by tether 119. The flash 72 is then scarfed by passing the tube 20c over scarfing tool 70.

In an alternative continuous tube forming and coating process, the metal strip 20a does not pass through reverser station 42, thereby leaving the coating 56 on the upper face of the strip 20a. In the forming station 58, the lateral edges of the strip are deformed or bent upwardly and inwardly toward one another as the tube is formed as in a conventional tube forming mill. The lateral edges of the strip are then rolled into nearly abutting relation at the upper portion of the open seam tube 20b having a metal coating 56 on the inner side of the open seam tube and leaving the adjacent lateral edges 48 slightly spaced. The open seam tube 20b is then received in the tube welding station 62, where the lateral edges of the strip are welded, as described above, with the seam in an upper portion of the tube. In the alternative continuous process of this invention, the tube 20c is then spirally twisted following welding to locate the welded seam 71 in the lower portion of the tube, as described, for example, in our related U.S. patent application Ser. No. 08/232,505, the disclosure of which is incorporated herein by reference. Following this twisting step, the seam will be located in a lower portion of the tube. It should, therefore, be apparent that locating this seam in a lower portion of the tube is important during the process of reflowing the metal coating over the seam surface, but not critical during the welding process, even though it is preferred.

As described above, the metal coating 56 adjacent the opposite lateral edges of the tube will melt or burn off in the weld zone by the forging temperature induced by the work coil 64. Thus, the coating 56 adjacent the edges should be removed to minimize burn-off of the coating at or adjacent the weld and minimize disposition of contaminants at the welded seam. Further, the weld seam 71 is relatively rough and therefore difficult to coat. Where the tube is galvanized after welding, the metal coating will tend to pull away from the seam as the tube emerges from the galvanizing bath because the seam is normally located at the top of the tube. In one embodiment of the tube welding and coating process of the present invention, the nearly abutting edges 48 are located near the bottom of the tube when the edges are welded, as shown in FIG. 5, such that the zinc or other coating melted by the welding process will flow downwardly over the seam, re-coating the seam with molten zinc. Where the thickness of the zinc coating 56 is built up adjacent the seam or where the coating has sufficient thickness, the zinc or other metal coating melted in the welding process may be sufficient to fully re-coat the seam without reheating, depending upon the thickness of the coating, the diameter of the tube and the speed of the line. However, in most applications, it will be necessary to remelt the metal coating to cause the metal coating to flow downwardly over the seam and cover the seam. In one preferred embodiment, as described below, additional coating material may be applied to a lower portion of the inside surface of the tube 20c to obtain a better coating over the seam.

Following welding, the welded tube 20c enters a cleaning station 84, where the external surface of the welded tube 20c is cleaned following scarfing. In a typical application, the outside surface of the welded seam is first cleaned and roughened with a rotating wire brush to remove scale, then cleaned with muriatic acid, which further removes any oxides, then thoroughly rinsed. The inside surface of the welded tube 20c remains in a non-oxidizing atmosphere during this process step.

A preferred alternative embodiment of the invention herein comprises passing the welded seamed tube through a scarfing process after coating the tube, which removes oxides at the outside surface of the seam, as shown in FIG. 14. The seamed tube 20c exits the welding station 62 while the weld 71 in the seamed tube 20c is still hot, i.e., greater than about 1100° F., through gas seal 112. The seamed tube 20c then passes over a scarfing tool 70 which removes a substantial portion of the flash 72 from the outer portion of the seam. A backup roller 74 engages the opposed surface of the tube, counter-acting the pressure of the scarfing tool 70. Since the outside surface of the seam 71 is still hot and in atmosphere (i.e., no longer in a non-oxidizing atmosphere), the outside surface of the seam will oxidize. Following this scarfing step, the tube is immediately cooled at quenching station 80 to a temperature where oxidization of the outside surface of the seam 71 is minimized, e.g., less than about 300° F. Although the propensity of the outside seam surface to oxidation is greatly reduced at these temperatures, a thin layer of outside seam surface may contain oxides which will prevent proper reflow of the outside metal coating over the outside surface of the seam 71. Therefore, the seamed metal tube 20c is passed over a second scarfing apparatus which removes this thin oxidized layer. As shown in FIG. 14, the second scarfing apparatus is a wire brush 182 which rotates counter-clockwise against the direction of the continuously moving tube 20c. This "cold" scarfing step removes an additional layer of potentially oxidized metal which, as described above, is detrimental to the reflow of the metal coating. The "cold" scarfing process step, in the alternative, include any process which will remove the outer layer of the seamed surface which contains oxides, including scarfing, grinding, wire brushing and abrading.

In another alternative embodiment of the present invention, a flux is sprayed onto the outside surface of the seam after the "cold" scarfing step. As shown in FIG. 14, a spray nozzle 187 is directed at the outside surface of the seamed metal tube 20c where the outside seam surface passes. The nozzle 187 is connected to a source of flux 185, which preferably contains potassium salts of fluorine and boron, available from, e.g., Crown Alloys and sold under the tradename "SIL45White". The flux is sprayed or misted onto the outside weld surface by, e.g., blowing a non-oxidizing gas across the liquid flux creating a fine spray or mist, which is sprayed over the weld area on the outer surface of the tube. The flux reduces any oxides at the outside weld surface, thereby providing a surface which will readily receive the metal coating over the outside surface of the seam 71 during a reflow or a galvanizing step.

In the process of this invention, a lower portion of the tube 20c is then reheated to a temperature above the melting temperature of the metal coating, but substantially below the melting temperature of the tube, and the coating material melts and coats the seam. Where the metal coating comprises a zinc alloy containing no less than about 99% zinc, the temperature of the lower portion of the tube is preferably from about 825° F. to about 875° F. In the disclosed embodiment of the process of this invention, an induction coil 110 is located opposite the lower portion of the tube which heats the lower portion of the tube 20c, thereby melting a portion of the metal coating. Because the seam is located in the lower portion of the tube, the molten zinc or other metal coating flows downwardly toward the seam. In a preferred embodiment, metal coating 56 is built up at points adjacent the inside surface of the seam 71. As the lower portion of the tube is heated, the metal coating 56 melts, flows downwardly and collects at the bottom of the tube, coating the seam 71 with a protective metal coating 56a, as shown in FIG. 7. In a preferred alternative embodiment of the present invention, additional coating material is applied to the inside surface of the seam 71, as described further below. The induction coil 110 is preferably located within an enclosure 88, such that the tube is maintained within a non-oxidizing atmosphere during reheating, to avoid oxidation of the exposed surfaces of the weld prior to coating the weld. The inside surface of the tube has remained in a non-oxidizing atmosphere with plug 117 retaining non-oxidizing gas in the tube and preventing oxidizing gases from entering the tube. Enclosure 88 may be nothing more than a sleeve enclosing the tube in the heated area. In such case, the induction coil 110 can be located outside of the enclosure. As will be understood, the seam 71 may be preferably located near the bottom of the tube, particularly where only the internal surface of the tube is coated, such that the metal coating 56 "puddles" over the weld. However, the seam may be located anywhere in the lower portion of the tube, provided the induction coil 110 is located adjacent the seam. More preferably, the seam is located in the lower third portion of the tube. Where the seam is spaced from the bottom of the tube, the molten metal coating will flow over the seam, which is advantageous.

As used herein, reheating may comprise maintaining the temperature of the welded tube 20c, bringing the temperature of the welded tube to about the melting temperature of the coating, or more preferably, may include supplemental heating a lower portion of the tube to a temperature about or above about the melting temperature of the metal coating, which is preferably zinc or a zinc alloy. The tube seam 71 may be cooled to a temperature below the melting temperature of the metal coating between the welding process step and reheating process step of the present invention. Therefore, reheating may comprise heating a lower portion of the tube from a temperature below the melting temperature of the metal coating to a temperature about or above about the melting temperature of the metal coating. Depending upon the diameter of the tube and the speed of the line, no further heating may be required to cause the metal coating to flow over the seam. Alternatively, the tube may be allowed to cool from the welding temperature, then maintained at about the melting temperature of the metal coating by a parallel induction coil. Since the welding process step of the present invention concentrates a great deal of heat in a localized area around the welded seam, this heat will generally dissipate through the tube material away from the welded seam 71. Thus, reheating may include allowing the heat to dissipate through the tube material, thereby bringing the lower portion of the tube to about or above about the melting temperature of a coating material.

In an alternative embodiment of the present invention, a portion of the tube containing seam 71 is flattened and then this portion of tube 20c is reheated to about the melting temperature of the metal coating 56 with the seam 71 in a lower portion of the tube. As shown in FIG. 20, the tube 20c includes a flattened lower portion having a seam 71 and a rounded upper portion. A lower portion of the tube 20c has a radius of curvature substantially greater than the radius of curvature of the upper portion of the tube. Preferably, the radius of curvature of the lower portion is at least about five times the radius of curvature of the upper portion of the tube 20c. The flattened lower portion of the tube, when reheated, will provide a more gentle flow of melted coating material 56 over the inside surface of the welded seam 71 in the coating process step described above. The flattening of the tube material 20 may be performed in forming station 58 such that the tube shaped strip 20b is formed with flattened portions adjacent the lateral edges 48 of tube 20b. The tube is then welded according to the welding process step described above. Alternatively, the flattened tube may be formed in a forming station following the scarfing tool 70 before cleaning station 84 in a conventional manner. The tube is reformed in sizing station 118 to provide a tube that is substantially round.

As shown in FIGS. 8 and 9, a preferred embodiment of the present invention includes a lance 77 which applies metal coating material to the inner surface of the seam preferably at a point where at least a lower portion of the tube is heated to the melting temperature of the metal coating. As described above, where the metal strip 20a has been coated at galvanizing station 36 in FIG. 1A, the metal coating 56 may burn off at the weld zone during welding because of the extreme temperatures induced in the nearly abutting edges of the open seam tube. Alternatively, coating 56 may have been removed adjacent the lateral edges 48 of metal strip 20 in the edge-conditioning station 44, as described above. There may be insufficient coating to fully cover the inner surface of the seam 71 during reheating of the lower portion of the tube. It may be important not to starve the inner surfaces remote from the welded seam of metal coating material to avoid oxidation, corrosion or deterioration of these tube surfaces. A lance 77 is therefore provided which extends upwardly between the opposed edges of the open seam tube 20b, then axially over the impeder 66 to a nozzle 73 which preferably projects downwardly to apply a metal coating material over the seam which is located in the lower portion of the tube. In an alternative embodiment, the lance extends through impeder 66. The lance 77 is preferably connected to a source of coating material under pneumatic pressure 74.

The coating material preferably comprises ultra fine particles or a powder of the coating metal including powdered zinc or zinc alloy. The metal coating material may be the same metal as the metal coating 56 or may be an alloy of the metal coating 56. Since certain coating metals may be explosive in powdered form, (e.g., aluminum powder), the coating material may be applied in other forms, such as molten metal, metal ribbon, foil or wire. The metal coating material may contain flux (e.g., as little as 2% or less flux) or may be suspended in flux. The flux may be solid or liquid in form. A suitable flux for a zinc coating material is manufactured and sold by Engelhard Corporation of Plainville, Mass., under the tradename "Ultra-Flux", which is a water-based paste containing potassium salts of fluorine and boron. The flux material may be diluted by at least about 2:1 with water to obtain a low enough viscosity to apply the coating material as a spray. The coating material may exclude the flux and may be applied by blowing a non-oxidizing gas containing powdered coating metal through lance 77 over the seam 71. The metal coating material, preferably a Zn/Al alloy, when applied with flux comprises at least about 90%, by weight, of the coating material. The flux in the coating material chemically reduces and eliminates oxides at the seam and forms a blanket, preventing additional oxides from forming at the seam.

The coating material may be applied where at least the lower portion of the welded tube is heated by induction coils 110 to reflow the metal coating 56. For ease of reference, lance 77 in FIG. 8 is shown over coils 110. However, it is anticipated that flux lines produced by the coils may make it difficult to apply the coating material over the induction coils 110. Therefore, a preferred embodiment of the present invention includes applying metal coating material after reheating tube 20c, downstream of the induction coils. Most of the flux (when present) will burn off at the seam 71 allowing the Zn/Al alloy particles in the coating material to melt and saturate and bond with the seam, thereby forming a smooth adherent coating over the inside surface of the seam 71. In another embodiment, where the seam is located in an upper portion of the tube, a lance may be positioned above the tube, spraying the metal coating material down over the outer surface of the tube in a location where the outer surface of the seam passes. A similar metal coating, as described and provided above for the inner surface of the tube, is provided for the outer seam surface. The coating material may also be sprayed up onto the outer seam surface in a lower portion of the welded tube, as described below.

In an alternative embodiment of the present invention, the process step of applying a coating material to the inner surface of the seam includes laying down a wire, ribbon or foil comprising a coating metal at a point where at least the lower portion of the tube is heated to above the melting temperature of the coating metal. The wire will partially melt and adhere to the inner surface of the seam and move along with the tube, thereby pulling additional material in through the spaced lateral edges of the tube and along with the tube. The coating metal will melt to saturate and bond with the inside surface of the seam, thereby forming a smooth coating over the inside surface of the seam 71.

In any of the alternative embodiments described above comprising adding a metal coating material, the metal coating material will melt at a point where the lower portion of tube 20c is heated to at least about the melting temperature of the metal coating material. Where, for instances, the metal coating 56 is insufficient to coat the welded seam surface, the metal coating material will melt and cover the welded seam surface, as shown in FIG. 7 and as described above. Metal coating material 56a and metal coating 56 will preferably blend adjacent the welded seam surface to provide a uniform metal coating over the entire inside or outside surface of metal tube 20c. The added metal coating material can have a higher or lower melting temperature than metal coating 56 to increase or decrease fluidity of the coating material and/or the melting temperature thereof.

As shown in FIGS. 1A and 8, the induction coil 110 is downstream of the impeder 66 and work coil 64. The temperature of the tube 20c at line A in FIGS. 1A and 8 is the forging temperature of the metal strip 20, e.g., 2300° F. or greater. The temperature of the tube 20c at line B in FIGS. 1A and 8 must below the vaporization temperature of the metal coating 56 and is preferably about or below the melting temperature of the metal coating 56. Therefore, the distance between the forging step and the coating step of the present invention should be sufficient to allow the temperature of the portion of the tube including the seam to decrease to at least a temperature where the metal coating 56 will not vaporize or boil. Preferably, the seam should be allowed to cool to a temperature below about the melting temperature of the metal coating 56. The seam 71 may be allowed to cool to a temperature below the melting temperature of the metal coating 56, followed by reheating to the melting temperature of the metal coating 56. One skilled in the art will understand that the cooling rate between lines A and B will depend on at least the speed of the tube moving through the process and the thickness of the metal strip 20 and the metal tube 20c.

Figure 8A:
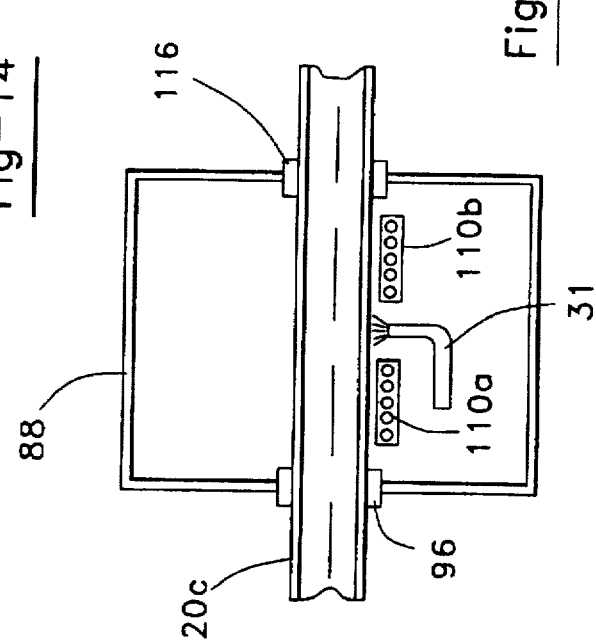
FIG. 8A is a partial schematic diagram illustrating a preferred embodiment of a coating step of a tube forming and coating process of this invention.

A preferred embodiment of the present invention includes metalizing an outer surface of the welded seam, as shown in FIG. 8A. Seam tube 20c enters enclosure 88 through a gas seal 96 wherein a non-oxidizing atmosphere is maintained, as described above. Tube 20c passes over a first induction coil 110a, which heats a lower portion of tube 20c to a temperature below about the melting temperature of metal coating 56. Coating apparatus 81 applies a metal coating material over the outer surface of the welded seam 71 location in a lower portion of the tube 20c. Tube 20c then passes over a second induction coil 110b where a lower portion of tube 20c is heated to about the melting temperature of the metal coating material. The heating of the tube to above the melting temperature of the metal coating material helps adhere the metal coating material to the outside surface of the tube, including the outside seam surface. Tube 20c then exits enclosure 88 through a gas seal 116 which may be of the conventional type or a wiper nozzle as described in our earlier application Ser. No. 08/083,099. Coating apparatus 81 may include a lance of the type described above, but may also include a thermal spraying apparatus of the type known in the art, including a flame spray apparatus, or a plasma spray apparatus. Because a lower portion of tube 20c is heated to almost the melting temperature of the metal coating material, the application of the coating material through coating apparatus 81 is more efficient and effective by providing good adherence of the coating material to the outside surface of the seam 71. The additional heating provided by the second heating coils 110b insures proper melting of the coating material over the outside surface of the seam and provides a smooth coating surface over the seam. The non-oxidizing atmosphere in enclosure 88 insures that the outside surface of the seam 71 does not oxidize and prevent the coating material from adhering to the outside surface of the seam 71. In an alternative embodiment, the outside surface of the tube 20c may be coated with a metal coating material having a higher melting temperature, e.g., zinc alloy, and the inside surface of the tube 20c may be coated with a metal coating material having a lower melting temperature, e.g., zinc, to control or prevent dripping of the coating material on the outside surface of the tube.

As shown in FIGS. 10 and 11, a preferred embodiment comprises a control loop for re-heating the seamed metal tube after welding and scarfing the tube. The control loop comprises a series of staggered heating coils 162, 164 and 166, which heat at least a lower portion of the seamed metal tube. Each coil is connected in parallel to a control means 170. An ultrasonic measuring system comprises ultrasonic testers 180a and 180b, provided upstream and downstream of the heating coils, respectively which relay information relating to the thickness of the coating 56 on the inside surface of the tube 20c to the control means 170. The control means 170 receives, collects and compares the data provided by the upstream and downstream ultrasonic testers 180a and 180b, respectively, and controls the various heating coils to increase or decrease the heat emitted and the coverage area as required to provide correct reflow of the coating 56 over the inner surface of the seam 71. One skilled in the art will appreciate that the amount of zinc that will flow down the inner surface of the seamed tube is nearly proportional to the amount of surface heated. Since the area to be covered and the thickness of zinc coating available for this reflow are continuously varying, the control loop has been found to be advantageous. The control loop is able to localize the area to which heat is supplied to get proper reflow of the metal coating 56 over the seam 71. If the temperature in the area adjacent the weld 71 is too hot, metal coating covering the nearly vertical wall of the seamed metal tube and the upper portion of the seamed metal tube will melt and flow downwardly toward the seam 71. If too much metal coating melts, these surfaces will be exposed and susceptible to oxidation much like the seam was before reflow. If too little heat is supplied to the area adjacent the weld, insufficient metal coating will flow downwardly toward the seam 71 and part or all of the seam will be exposed and susceptible to oxidation. FIG. 11 illustrates a cross section of the tube during re-heating and the preferred heat gradients of the tube and coating during m-heating of the seamed metal tube 20c. Good puddling of the metal coating 56 occurs in the lower portion of the seamed metal tube 20c where the seam 71 is located providing a smooth metal coating over the inner surface of the seam in the final seamed metal tube product.

In an alternative embodiment of the preferred control loop invention, a temperature measuring system may substitute the ultrasonic measuring system described above. The temperature measuring system can be located either upstream and downstream of the heating coils or, alternatively, downstream of the heating coils 162, 164 and 166. The temperature measuring system provides information to the control means 170 relating to the temperature of, for example, the lower portion of the tube 20c. The control means 170 receives, collects and compares these data provided by the temperature measuring system and controls the heating coils to increase or decrease the heat emitted by the heating coils such that the metal coating in a lower portion of the tube melts and flows downwardly toward the seam; however, the metal coating in an upper portion of the tube does not melt, but remains substantially intact over the upper portion of the tube 20c. A temperature measuring system of the type useful herein is available from Land Infrared, Crystal, Pa., sold under the tradename Landmark X Thermometer. System 3 Ratio Thermometer, Model no. RP-42 or RP-10 are also useful herein.

Prior to galvanizing the outside surface of the seamed tube 20c, the tube is heated to a temperature approximating the temperature of the molten zinc or alloy in the galvanizing tank, or about 850° F., in the heat enclosure 88. Although any suitable means may be used to heat the tube, including, for example, conventional internal and external heaters, the preferred method utilizes an induction heater having coils 90, which induces a current in the tube, as described above. Since the metal coating on the inside surface of the seamed tube 20c, e.g., Zn/Al alloy, is of a higher melting temperature than the outside metal coating, e.g., zinc, the inside metal coating over the inner surface of the seam 71 is not disturbed during this step. A non-oxidizing gas, preferably nitrogen, is injected into the heat enclosure 88 through line 93 from a source of gas under pressure 95. The tube 20c enters the heat enclosure 88 through a gas seal 96 of the type known in this art. The preheated tube then enters sealed housing 98 through coupling 140. The housing 98 includes a lower reservoir 103 which is preferably filled with molten zinc. A non-oxidizing gas, e.g., nitrogen gas with a low level of hydrogen, is injected into the upper chamber 144 of the housing through line 107. The tube then enters the galvanizing tank 108 through a conventional gas seal 111. Molten zinc is pumped from the lower reservoir 103 of the housing into the galvanizing tank 108 by pump 112. The tube 20c thus enters the galvanizing tank 108 below the level of the molten zinc as shown in FIG. 1B; however, nitrogen or some other non-oxidizing gas is injected into the upper portion of the galvanizing tank through line 114, maintaining an non-oxidizing atmosphere in the galvanizing tank to reduce oxidation and dross. The tube 20c then emerges from the galvanizing tank through a gas seal 115 into the upper chamber 144 of the housing and tube is then received through a final gas seal 116.

As described above, others have recognized the advantages of maintaining the galvanizing tank or pot in an inert or non-oxidizing atmosphere. However, such efforts have not been fully successful because the housing 98 must be periodically entered to replenish the zinc and for maintenance. In a preferred galvanizing bath apparatus of this invention, however, the galvanizing tank may be sealed and located within a sealed housing. Thus, the housing 98 may be entered to replenish the zinc, for example, without exposing the galvanizing tank to an oxidizing atmosphere, which would damage the quality of the zinc coating on the tube. Further, it is possible to control the pressure of the non-oxidizing gas in the heated enclosure 88, the housing 98 and the galvanizing tank 108. In the most preferred embodiment, the non-oxidizing gas pressure in the galvanizing tank 108 is greater than the gas pressure in the housing 98, such that air or other contaminating gas will not leak back into the galvanizing tank. Similarly, the pressure in the heat chamber 88 is greater than the pressure in the housing 98 to avoid leak back of oxidizing gas into the heat chamber. It should be understood that other applications for replenishing the zinc are known in the art which do not disturb the kettle or pot.

In an alternative embodiment of the present invention, the exterior surface of the weld 71 can be thermal sprayed instead of galvanizing the outside surface of the seam, as described above. The thermal spraying process step includes a flame spray process or plasma spray process which are known in the art.

The tube is then cooled by immersing the tube in cold water or other coolant in the cooling chamber 113, thereby solidifying the metal coating on the tube. Non-oxidizing gas is prevented from escaping the inside tube by a cylindrical plug 117 which may be attached to the end of the impeder by a tether 119. The plug 117 may be made of a friction resistant thermoset plastic, such as nylon, and is preferably located sufficiently downstream from the induction coil 110 and following cooling to avoid damage to the plug. Plug 117 helps maintain the non-oxidizing atmosphere on the inside of the seamed tube, thereby maintaining a blanket of non-oxidizing gas over the seam. Plug 117 also prevents oxygen and air from entering the inside of the seamed tube. When a AC or DC welding apparatus is used, plug 117 may be attached to a bracket suspended on the inside surface of the tube or may be attached to the end of lance 77 by tether 119.

Following cooling, the tube 20c enters the final sizing station 118 which includes a plurality of sizing and straightening rolls 120. Thereafter, the tube is flooded with an aqueous chromate solution and rinsed at 122, which chemically etches and seals the zinc coating prior to final finishing. In a conventional tube mill, the tube is then marked at 124 with product identification and further markings as may be specified by the customer. A clear lacquer coat or other protective coating may then be applied in the OD paint station 126. An induction heating coil 128 may then be used to dry the tube and the tube is finally cut to length at the cutoff station 130.

In an alternative embodiment, a single galvanizing tank is used to coat the inside and outside surfaces of the seam in a seamed metal tube. As shown in FIGS. 10 and 11, a coating 56 is applied to the upper face of the metal strip 20 after having been cleaned and preformed into a downwardly opening arcuate shape. The metal strip 20 enters sealed housing 158 and then into galvanizing tank 148 through gas seals of the type known in the art. Just as in the coating apparatus of FIG. 1B, the housing 158 includes a lower reservoir 138 which is preferably filled with molten metal, e.g., molten zinc or zinc alloy. A non-oxidizing gas, preferably nitrogen and hydrogen, is injected into the upper chamber of the housing 152 through line 154 from a source of non-oxidizing gas 145. Molten zinc is pumped from the lower reservoir 138 into the galvanizing tank 148 by pump 142. The metal strip 20a enters the galvanizing tank 148 above the level of molten zinc, as shown in FIG. 13. The metal coating, preferably molten zinc or zinc alloy, is applied to the upper face of the metal strip 20a, by pumping molten zinc from the supply of molten zinc in tank 148 over and onto the metal strip 20a using pump 149. The zinc flows downwardly toward the lateral edges of the strip, such that the thickness of the coating increases from the mid-portion toward the edges. The metal strip 20a then exits the galvanizing tank 148 and housing 158 preferably through a gas seal, or preferably, through a gas shaping nozzle of the type disclosed in the earlier referenced related U.S. Pat. No. 5,344,062 of Krengel et al. As described above, the metal strip 20a is advanced through flat roll, reversing, edge conditioning, preforming, forming, welding and cleaning stations. The seamed metal tube 20c then re-enters the sealed housing 158 through coupling 200 and into the galvanizing tank 148 through a conventional gas seal 220. The tube 20c enters the galvanizing tank below the level of the molten zinc, as shown in FIG. 13. Non-oxidizing gas is injected into the upper portion of the galvanizing tank 148 through line 147, maintaining a non-oxidizing atmosphere in the galvanizing tank to reduce oxidation and dross. The tube 20c emerges from the galvanizing tank through gas seal 175 into the upper chamber 152 of the housing 158 and the tube is received through a final gas seal 176.

In this embodiment of the galvanizing bath apparatus and process of this invention, a seamed metal tube is coated, both on the inside and outside surfaces thereof, in a single galvanizing tank, which is sealed and located in a sealed housing. It is possible to replenish the zinc without exposing the galvanizing tank to an oxidizing atmosphere and to control the pressure of the non-oxidizing gas in the housing 158 and galvanizing tank 148, such that air or other contaminating gas will not leak back into the galvanizing tank 148. Additionally, with the seam in the lower portion of the tube 20c, when the tube is advanced through the galvanizing tank 148, the coating on the inside surface of the tube will melt and flow over the seam where it will puddle and provide a smooth coating over the inner surface of the seam 71. Having passed through the galvanizing tank, the outside surface of the seam 71 will also be coated, protecting the seam from oxidation.

As will now be understood, the forming and welding and coating of the tube in the manner described herein provides for the coating of the inner and outer surfaces of the seam without requiring special coating equipment. There are disclosed herein several means for coating the inner and outer surfaces of the seam in a seamed metal tube with molten metal. These means can be used alone or in combination, as required by the parameters of the particular application, including tube size, mill speed, tube and coating material, welding temperature, etc. Further, various modifications may be made to the tube forming and coating process and apparatus of this invention within the purview of the appended claims. For example, as described above, the process of this invention may be utilized in a batch-type process, wherein the tube is cut to length following welding and the tube sections are then rotated to locate the seam in the bottom of the tube, prior to heating at least the lower portion of the tube to melt the metal coating and cause the molten metal coating to flow over the seam. Further, mix patterns may be applied to the inner and outer surfaces of the tube adjacent the seam to direct the flow of molten metal into the seam including a herring bone pattern which is known in the art. The tube may also be reheated by any suitable heating means, including radiant heaters. Further, the method of this invention may be utilized for coating the seam of tubes having special cross sections, including square and rectangular tubes. Finally, the tube may be welded by other conventional means, including, for example, resistance or flux welding.

Having described the process of this invention, we now claim the invention, as follows:

1. A method of forming a seamed metal tube having a metal coating on at least an inside surface of said tube from a continuously moving, relatively flat metal strip, said method comprising:

a) applying a metal coating to a top surface of said metal strip, said coating having a melting temperature substantially below the melting temperature of said metal strip;

b) forming said strip into a tube-shaped strip having opposed adjacent spaced lateral edges and said coating on an inner surface of said tube-shaped strip;

c) heating and integrally welding said adjacent edges of said tube-shaped strip to form a tube having a welded seam;

d) locating said seam in a lower portion of said tube and blanketing at least an inner surface of said seam with a non-oxidizing gas;

e) reheating at least said lower portion of said tube to the melting temperature of said metal coating, said metal coating then flowing downwardly over and coating said inner surface of said seam.

2. The method of forming a coated seamed tube as recited in claim 1, wherein step a) comprises coating said strip with a metal coating having a thickness which increases from a mid-portion toward said lateral edges.

3. The method of forming a coated seamed tube as recited in claim 1, wherein said method includes heating and welding said edges of said tube-shaped strip and reheating said tube in an enclosure, said method further including continuously introducing a non-oxidizing gas under pressure into said enclosure maintaining a non-oxidizing atmosphere therein.

4. The method of forming a coated seamed tube as recited in claim 1, wherein step d) comprises introducing a non-oxidizing gas to at least an area adjacent said seam and providing a plug in said tube, thereby reducing the escape of said non-oxidizing gas from said inside surface of said tube.

5. The method of forming a coated seamed tube as recited in claim 4, wherein said method comprises heating and integrally welding said edges of said tube-shaped strip in a non-oxidizing atmosphere.

6. The method of forming a coated seamed tube as recited in claim 1, wherein said method comprises reheating said tube in a non-oxidizing atmosphere.

7. The method of forming a coated seamed tube as recited in claim 6, wherein said method comprises introducing said non-oxidizing gas into said inside surface of said tube.

8. A method of forming a seamed metal tube having a metal coating on at least an inside or outside surface of said tube from a continuously moving, relatively flat metal strip, said method comprising:

a) forming a metal strip having a metal coating material on at least one side of said strip into a tube-shaped strip having opposed adjacent spaced lateral edges and said metal coating material on an inner or outer surface of said tube-shaped strip, said metal material having a melting temperature substantially below the melting temperature of said metal strip;

b) heating said adjacent edges of said strip to at least about the forging temperature of said strip and integrally welding said adjacent edges to form a tube having a welded seam;

c) cooling said adjacent edges of said strip to below about the vaporization temperature of said metal coating material;

d) reheating at least a lower portion of said tube to at least about the melting temperature of said metal coating material, with said welded seam in a lower portion of said tube; and e) melting said metal coating material over said inner or outer surface of said seam in said lower portion of said tube, thereby forming a tube with said metal coating material over an entire inside or outside surface of said tube including said inner or outer surface of said seam.

9. The method of forming a coated seamed tube as recited in claim 8, wherein said metal coating is sufficient to cause said metal coating to flow over and coat said inner or outer surface of said welded seam.

10. The method of forming a coated seamed tube as recited in claim 8, comprising adding metal coating material to said inner or outer surface of said seam.

11. The method of forming a coated seamed tube as recited in claim 8, wherein reheating said lower portion of said tube causes said metal coating to flow toward said seam and wherein melting said metal coating material includes adding metal coating material to said inner or outer surface of said seam.

12. The method of forming a coated seamed tube as recited in claim 8, further comprising introducing a non-oxidizing gas to at least an area where said adjacent edges are welded, thereby blanketing said weld area with said non-oxidizing gas.

13. The method of forming a coated seamed tube as recited in claim 8, comprising heating and welding said adjacent edges, and reheating said at least lower portion of said tube in a non-oxidizing atmosphere.

14. The method of forming a coated seamed tube as recited in claim 8, wherein said adjacent edges are cooled to below the melting temperature of said metal coating.

15. The method of forming a coated seamed tube as recited in claim 14, comprising adding metal coating material to said inner or outer surface of said seam before reheating said lower portion of said tube.

16. The method of forming a coated seam tube as recited in claim 8, wherein said adjacent edges are cooled to about the melting temperature of said metal coating.

17. The method of forming a coated seamed tube as recited in claim 16, comprising adding metal coating material to said inner or outer surface of said seam.

18. The method of forming a coated seamed tube as recited in claim 17, wherein said metal coating material is added before reheating said lower portion of said tube.

19. A method of forming a seamed metal tube having a metal coating on at least an inside surface of said tube from a continuously moving, relatively flat metal strip, said method comprising:

a) forming a metal strip having a metal coating material on at least one side of said strip into a tube-shaped strip having opposed adjacent spaced lateral edges and said metal coating material on at least an inner surface of said tube-shaped strip, said metal coating material having a melting temperature substantially below the melting temperature of said metal strip;

b) heating said adjacent edges of said strip to at least about the forging temperature of said strip and integrally welding said adjacent edges to form a tube having a welded seam;

(c) cooling said adjacent edges of said strip to below about the vaporization temperature of said coating;

d) reheating at least a lower portion of said tube to at least about the melting temperature of said metal coating, with said welded seam in a lower portion of said tube; and e) coating said inner surface of said seam with said metal coating material, thereby forming a tube with said metal coating material over an entire inside surface of said tube including said inner surface of said seam.

20. The method of forming a coated seamed tube as recited in claim 19, wherein said metal coating on said inner surface of said tube is sufficient to cause said metal coating to flow over and coat said inner or outer surface of said welded seam.

21. The method of forming a coated seamed tube as recited in claim 19, comprising adding metal coating material to said inner surface of said seam.

22. The method of forming a coated seamed tube as recited in claim 19, wherein reheating said lower portion of said tube causes said metal coating to flow toward said seam and wherein melting said metal coating material includes adding metal coating material to said inner surface of said seam.

23. The method of forming a coated seamed tube as recited in claim 19, wherein said adjacent edges are cooled to below the melting temperature of said metal coating.

24. The method of forming a coated seamed tube as recited in claim 23, comprising adding metal coating material to said inner surface of said seam and before reheating said lower portion of said tube.

25. The method of forming a coated seamed tube as recited in claim 19 wherein said adjacent edges are cooled to about the melting temperature of said metal coating.

26. The method of forming a coated seamed tube as recited in claim 25, comprising adding metal coating material to said inner surface of said seam.

27. The method of forming a coated seamed tube as recited in claim 26, wherein said metal coating material is added before reheating said lower portion of said tube.

28. A method of forming a seamed metal tube having a metal coating on at least an inner surface of said tube from a continuous moving metal strip, comprising the following steps performed in sequence:

a) applying a first metal coating material to at least one surface of said strip, said first metal coating material having a melting temperature substantially below the melting temperature of said strip;
  b) rolling and forming said metal strip into a tube-shaped strip having said one coated surface located on an inner surface of said tube-shaped strip and spaced adjacent lateral edges;
  c) heating and integrally bonding said edges of said tube-shaped strip together to form a tube having a welded seam; and
  d) applying a second metal coating material to at least an inner surface of said seam downstream of said bonding step onto said seam located in a lower portion of said tube, thereby coating said seam, said second coating material comprising fine metal particles having a melting temperature substantially below the melting temperature of the metal tube; and
  e) reheating said lower portion of said tube to at least about the melting temperature of said first and second metal coating material, thereby coating said seam with metal coating material.

29. The method of forming a coated seamed tube as defined in claim 28, wherein said method includes applying said metal coating material in a substantially non-oxidizing atmosphere.

30. The method of forming a coated seamed tube as defined in claim 28, wherein said metal particles are suspended in a flux.

31. The method of forming a coated seamed tube as recited in claim 30, wherein said metal coating in step a) comprises an alloy containing zinc and said molten metal comprises zinc alone.

32. The method of forming a coated seamed tube as defined in claim 30, wherein applying said metal coating material comprises locating a lance between said spaced edges of said tube-shaped strip, said lance having a nozzle located downstream of said bonding step and projecting toward said inside surface of said seam and spraying said coating material onto said seam, wherein said flux is burned off and said metal particles melt and bond to said inner surface of said seam.

33. The method of forming a coated seamed tube as defined in claim 28, wherein said method further comprises coating an outer surface of said tube by immersing said tube in molten metal, said metal flowing downwardly over and coating an outer surface of said seam.

34. The method of forming a coated seamed tube as recited in claim 33, wherein said zinc alloy contains from about 5% to about 55%, by weight, aluminum.

35. The method of forming a coated seamed tube as defined in claim 34, wherein said method includes heating and integrally bonding said edges of said tube-shaped strip and applying said coating material in an enclosure, said method further comprising continuously introducing a non-oxidizing gas under pressure into said enclosure maintaining said non-oxidizing atmosphere.

36. A method of forming a seamed metal tube having a metal coating on an inner and outer surface of said tube from a continuously moving metal strip, comprising the following steps performed in sequence:

a) applying a first metal coating to one surface of said strip, said first coating having a melting temperature substantially below the melting temperature of said metal strip;
  b) forming said metal strip into a tube-shaped strip having opposed adjacent spaced lateral edges and said coated surface located on an inner surface of said tube-shaped strip;
  c) heating and integrally welding said adjacent edges of said tube-shaped strip to form a tube having a welded seam;
  d) reheating at least a lower portion of said tube to the melting temperature of said first coating with said welded seam in said lower portion of said tube, said coating then flowing downwardly over and coating said seam on the inner surface of said tube;
  e) applying a second metal coating to said outer surface of said tube by immersing said tube in molten metal, said molten metal flowing downwardly over said seam and coating said seam at the outer surface of said tube, wherein said second coating has a melting temperature below the melting temperature of said first coating.

37. The method of forming a coated seamed tube as recited in claim 36, wherein step a) comprises coating said strip with a metal coating having a thickness which increases from a mid-portion toward said lateral edges.

38. The method of forming a coated seamed metal tube as recited in claim 37, wherein said method includes preforming said strip into a downwardly opening arcuate shape prior to applying the metal coating to the metal strip.

39. The method of forming a coated seamed tube as recited in claim 36, wherein said first coating comprises an alloy containing zinc and said second coating comprises zinc.

40. The method of forming a coated seamed tube as recited in claim 39, wherein said zinc alloy comprises a zinc/aluminum alloy containing from about 5% to about 55%, by weight, aluminum.

41. The method of forming a coated seamed tube as recited in claim 39, wherein said method includes cooling said tube following reheating.

42. The method of forming a coated seamed tube as recited in claim 39, wherein said method comprises heating and integrally welding said edges of said tube-shaped strip and reheating said tube in an enclosure having a non-oxidizing atmosphere.

43. The method of forming a coated seamed tube as recited in claim 42, said method further comprising continuously introducing a non-oxidizing gas under pressure into said enclosure maintaining said non-oxidizing atmosphere.

44. A method of forming a seamed metal tube having a metal coating on an inner and outer surface of said tube from a continuously moving metal strip, comprising the following steps performed in sequence:
 a) passing said strip through an upper chamber of an enclosed tank having a non-oxidizing atmosphere in said upper chamber and a reservoir of molten metal alloy in a lower chamber;
 b) applying a coating of said molten metal coating to a top surface of said strip in said enclosed tank;
 c) forming said metal strip into a tube-shaped strip having opposed adjacent spaced lateral edges and said coated surface on an inner surface thereof;
 d) heating and integrally welding said adjacent edges of said tube-shaped strip to form a tube having a welded seam; and
 e) coating said outer surface of said tube by passing said tube through said molten metal coating in said lower chamber of said enclosed tank with said welded seam in a lower portion of said tube, said molten metal flowing downwardly over said seam and coating said seam at the outer surface of said tube and reflowing said metal coating on said inner surface downwardly over and coating said seam on the inner surface of said tube.

45. The method of forming a coated seamed tube as recited in claim 44, said method further comprising continuously introducing a non-oxidizing gas under pressure into said upper chamber of said enclosure maintaining said non-oxidizing atmosphere.

46. The method of forming a coated seamed tube as recited in claim 44, wherein step 6 comprises coating said strip with a metal coating having a thickness which increases from a mid-portion toward said lateral edges.

47. The method of forming a coated seamed metal tube as recited in claim 46, wherein said method includes preforming said metal strip into a downwardly opening arcuate shape prior to applying the metal coating to the metal strip.

48. A method of forming a seamed metal tube having a metal coating on an inner and outer surface of said tube from a continuously moving metal strip, said coating having a melting temperature substantially below the melting temperature of said metal strip, said method comprising the following steps performed in sequence:
 a) running said strip through a molten metal coating bath apparatus comprising:
  a sealed housing assembly having a lower reservoir of molten metal and an upper chamber, a sealed tank located within said housing assembly, a pump means pumping molten metal from said reservoir into said tank and said tank having an upper chamber spaced above said molten metal,
 wherein said strip passes over said molten metal through said molten metal coating tank upper chamber;
 b) pouring molten metal over a top surface of said metal strip in said upper chamber of said tank;
 c) forming said metal strip into a tube-shaped strip having opposed adjacent spaced lateral edges and said coated surface on an inner surface thereof;
 d) heating and integrally welding said adjacent edges of said tube-shaped strip to form a tube having a welded seam; and
 e) coating said outer surface of said tube with said molten metal by passing said seamed tube through said molten metal bath apparatus below the level of said molten metal in said galvanizing tank with said welded seam in a lower portion of said tube, said molten metal flowing downwardly over said seam and coating said seam at the outer surface of said tube and reflowing said coating on said inner surface downwardly over and coating said seam on the inner surface of said tube.

49. The method of forming a coated seamed tube as recited in claim 48, said method further comprising continuously introducing a non-oxidizing gas under pressure into said housing upper chamber at one pressure and said tank upper chamber at a second pressure less than said first pressure to maintain said tank in a non-oxidizing atmosphere.

50. The method of forming a coated seamed tube as recited in claim 48, wherein said molten metal is selected from the group consisting of zinc, aluminum and their alloys.

51. The method of forming a coated seamed metal tube as recited in claim 50, wherein said molten metal comprises zinc.

52. The method of forming a coated seamed tube as recited in claim 48, wherein step b) comprises coating said strip with a metal coating having a thickness which increases from a mid-portion toward said lateral edges.

53. The method of forming a coated seamed metal tube as recited in claim 52, wherein said method includes preforming said metal strip into a downwardly opening arcuate shape prior to applying the metal coating to the metal strip.

54. A method of forming a seamed metal tube having a metal coating on at least an inner or outer surface thereof from a continuous moving metal strip, said method comprising:
 a) applying a metal coating to at least one surface of said strip, said coating comprising a first metal coating material having a melting temperature substantially below the melting temperature of said strip;
 b) rolling and forming said metal strip into a tube-shaped strip having an inner and outer surface with said one coated surface located on one of said inner or outer surface of said tube-shaped strip and spaced adjacent lateral edges;
 c) heating and integrally welding said lateral edges of said tube-shaped strip together to form a tube having a welded seam;
 d) reheating at least a lower portion of said tube with said seam in said lower portion of said tuber to at least the melting temperature of said coating;
 e) coating said inner or outer surface of said seam with said first metal coating material or a second metal coating material while said seam remains at a temperature at least equal to the melting temperature of said metal coating material;
 f) providing a control loop for controlling flow of said metal coating material over said seam and limiting the amount of heat supplied to said lower portion of said tube during reheating and localizing said heat to an area adjacent said seam and confining the area having a temperature above the melting temperature of said metal coating material to said area adjacent said seam, thereby providing a smooth, uniform coating over said seam without stripping said coating from the remainder of said inner surface of said tube.

55. The method of forming a coated seamed tube as defined in claim 54, said control loop measuring the thickness of said coating over said seam.

56. The method of forming a coated seamed tube as recited in claim 55, wherein said method includes providing a plurality of staggered heating coils adjacent said lower portion of said tube and controlling said heating coils to heat said tube such that said area adjacent said seam of said tube is heated to at least the melting temperature of said metal coating but not more than about 50° F. above said melting temperature thereby reflowing said metal coating in said lower portion of said tube over said seam without stripping said coating from the remainder of said inner surface of said tube.

57. The method of forming a coated seamed tube as defined in claim 54, said control loop measuring the temperature of said seamed tube adjacent said welded seam.

58. The method of forming a coated seamed tube as recited in claim 57, wherein said method includes providing a plurality of staggered heating coils adjacent said welded seam and confining the heat supplied to an area adjacent said seam in said lower portion of said tube such that said area remains at a temperature no more than about 75° F. above the melting temperature of said metal coating material, thereby providing a smooth, uniform coating over said seam without stripping said coating from the remainder of said inner surface of said tube.

59. A method of forming a seamed metal tube having a metal coating on at least an inside or outside surface of said tube, said method comprising:

a) applying a metal coating material to at least one surface of a relatively flat metal strip, said metal coating material having a melting temperature substantially below the melting temperature of said metal strip;

b) removing said metal coating material from opposed lateral edges of said strip;

c) forming said strip into a tube-shaped strip having opposed adjacent spaced lateral edges of said metal coating material on at least an inner or outer surface of said tube-shaped strip;

d) heating and integrally welding said adjacent edges of said tube-shaped strip to form a tube having a welded seam with said metal coating material removed from adjacent said welded seam; and e) melting said metal coating material over said at least inner or outer surface of said welded seam.

60. The method of forming a coated seamed tube as recited in claim 59, comprising flattening a lower portion of said tube, wherein said metal coating material flows evenly over said inner or outer surface of said welded seam to provide a smooth, uniform coating over said seam, following by reforming said portion of said tube into a substantially circular shape.

61. The method of forming a coated seamed tube as recited in claim 59, said method comprising adding metal coating material to said inner or outer surface of said seam.

62. The method of forming a coated seamed tube as recited in claim 59, wherein reheating said lower portion of said tube causes said metal coating to flow toward said seam and melting said metal coating material includes metal coating material to said inner or outer surface of said seam, and coating said inner or outer surface of said seam.

* * * * *